(12) United States Patent
Hagadorn et al.

(10) Patent No.: US 11,180,580 B2
(45) Date of Patent: Nov. 23, 2021

(54) BENZAZOLE AND PSEUDOINDOLE DIAMIDO TRANSITION METAL COMPLEXES AND USE THEREOF IN OLEFIN POLYMERIZATION

(71) Applicant: ExxonMobil Chemical Patents Inc., Baytown, TX (US)

(72) Inventors: John R. Hagadorn, Houston, TX (US); Jo Ann M. Canich, Houston, TX (US); Mikhail I. Sharikov, Moscow (RU); Georgy P. Goryunov, Moscow (RU); Pavel S. Kulyabin, Moscow (RU); Dmitry V. Uborsky, Moscow (RU); Alexander Z. Voskoboynikov, Moscow (RU)

(73) Assignee: ExxonMobil Chemical Patents Inc., Baytown, TX (US)

( * ) Notice: Subject to any disclaimer, the term of this patent is extended or adjusted under 35 U.S.C. 154(b) by 59 days.

(21) Appl. No.: 16/829,712

(22) Filed: Mar. 25, 2020

(65) Prior Publication Data
US 2020/0308315 A1    Oct. 1, 2020

Related U.S. Application Data

(60) Provisional application No. 62/826,231, filed on Mar. 29, 2019.

(51) Int. Cl.
| C08F 4/64 | (2006.01) |
| C08F 4/642 | (2006.01) |
| C08F 10/06 | (2006.01) |
| C08F 10/02 | (2006.01) |

(52) U.S. Cl.
CPC ........ *C08F 4/64089* (2013.01); *C08F 4/6428* (2013.01); *C08F 10/02* (2013.01); *C08F 10/06* (2013.01)

(58) Field of Classification Search
CPC ........................... C08F 4/64089; C08F 4/6428
See application file for complete search history.

(56) References Cited

U.S. PATENT DOCUMENTS

| 5,153,157 | A | 10/1992 | Hlatky et al. .................. 502/117 |
| 5,447,895 | A | 9/1995 | Marks et al. .................. 502/117 |
| 5,453,410 | A | 9/1995 | Kolthammer et al. ....... 502/155 |
| 5,942,459 | A | 8/1999 | Sugano et al. ................ 502/117 |
| 6,175,409 | B1 | 1/2001 | Nielsen et al. ............... 356/337 |
| 6,211,105 | B1 | 4/2001 | Holtcamp ..................... 502/103 |
| 6,260,407 | B1 | 7/2001 | Petro et al. .................. 73/61.52 |
| 6,294,388 | B1 | 9/2001 | Petro ............................. 436/8 |
| 6,406,632 | B1 | 6/2002 | Safir et al. .................... 210/656 |
| 6,436,292 | B1 | 8/2002 | Petro ............................. 210/656 |
| 6,454,947 | B1 | 9/2002 | Safir et al. .................... 210/656 |
| 6,461,515 | B1 | 10/2002 | Safir et al. .................... 210/656 |
| 6,475,391 | B2 | 11/2002 | Safir et al. .................... 210/656 |
| 6,491,816 | B2 | 12/2002 | Petro ......................... 210/198.2 |
| 6,491,823 | B1 | 12/2002 | Safir et al. .................... 210/656 |
| 7,973,116 | B2 | 7/2011 | Hagadorn et al. ............. 526/172 |
| 8,658,556 | B2 | 2/2014 | Stewart ........................ 502/202 |
| 8,674,040 | B2 | 3/2014 | Hagadorn et al. ............. 526/172 |
| 9,249,238 | B2 | 2/2016 | Hagadorn et al. ........ C08F 4/76 |
| 2018/0002352 | A1 | 1/2018 | Hagadorn et al. ........ C07F 7/00 |

FOREIGN PATENT DOCUMENTS

| EP | 0573120 | 11/1998 | ............. C08F 10/00 |
| KR | 2018/022135 | 3/2018 | .......... C07D 263/52 |
| KR | 2018/022136 | 3/2018 | .......... C07D 263/54 |
| WO | 1994/007928 | 4/1994 | ............. C08F 4/643 |
| WO | 1995/014044 | 5/1995 | ............... C08F 4/02 |
| WO | 1998/043983 | 10/1998 | ............... C07F 5/02 |

OTHER PUBLICATIONS

Baier, M. C. et al. (2014) "Post-Metallocenes in the Industrial Production of Polyolefins," *Agnew. Chem., Int. Ed.*, v.53, pp. 9722-9744.

Girolami, G. S. (1994) "A Simple "Back of the Envelope" Method for Estimating the Densities and Molecular Volumes of Liquids and Solids," *Journal of Chemical Education*, v.71(11), Nov. 1994, pp. 962-964.

*Primary Examiner* — Catherine S Branch

(57) ABSTRACT

This invention relates to transition metal complexes represented by the formula:

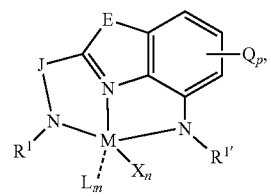

catalyst systems comprising the complexes, and polymerization methods for olefinic monomers using the catalyst systems. In said formula, M is a transition metal; E is $NR^2$, $CR^3R^4$, O, S, or $SiR^5R^6$; Q is optional substitution; p is an integer ranging from 0 to 3; L is an optional neutral ligand; m is an integer ranging from 0 to 3; X is an anionic leaving group; n is 1 or 2, with m+n being 4 or less; J is a linker group contributing two or three atoms that are located within a first chelate ring; $R^1$ and $R^{1'}$ are independently a hydrocarbyl group or a trihydrocarbylsilyl group; $R^2$ is a hydrocarbyl group; $R^3$ and $R^4$ are independently H, a hydrocarbyl group, or a trihydrocarbylsilyl group; and $R^5$ and $R^5$ are independently a hydrocarbyl group.

35 Claims, No Drawings

BENZAZOLE AND PSEUDOINDOLE DIAMIDO TRANSITION METAL COMPLEXES AND USE THEREOF IN OLEFIN POLYMERIZATION

CROSS REFERENCE TO RELATED APPLICATIONS

This application claims priority to U.S. Ser. No. 62/826,231, filed Mar. 29, 2019, herein incorporated by reference.

FIELD

This invention relates to diamido transition metal complexes and polymerization reactions using such transition metal complexes.

BACKGROUND

A number of catalysts have been developed for synthesizing polyolefins. The choice of catalyst may allow tailoring of various polyolefin properties, such as molecular weight, branching, tacticity, crystallinity, melt index, and similar features. Both metallocene and non-metallocene transition metal complexes have been used as olefin polymerization catalysts, depending upon the particular polyolefin properties being targeted. Activators such as alumoxanes and non-coordinating anion activators are commonly used in conjunction with both types of transition metal catalysts.

Several classes of tridentate diamido transition metal complexes have previously been used as catalysts for promoting olefin polymerization. As used herein, the term "amido" refers to an amine group bearing a formal negative charge when unbound to a transition metal center. Amido ligands may be prepared by deprotonation of primary or secondary amines, for example. The term "diamido" refers to two occurrences of such ligands. U.S. Pat. Nos. 7,973,116, 9,249,238, and 8,674,040, for example, describe tridentate pyridyldiamido complexes suitable for use in olefin polymerization. U.S. Patent Application Publication 2018/0002352, for example, describes tridentate quinolinyldiamido complexes suitable for use in olefin polymerization. Such transition metal complexes feature two amido ligands and one heteroaromatic nitrogen atom defining a tridentate ligand that is coordinatively bound to the transition metal center. Such transition metal complexes further feature one seven-membered chelate ring and one five-membered chelate ring, which are oriented in a non-planar fashion with respect to one another. The differently sized chelate rings and non-planarity thereof may dictate the rate at which ethylene and other olefins insert at the transition metal center in the course of undergoing polymerization. The effective chirality of the complexes may lead to production of isotactic polyolefins in some cases.

Despite the utility of pyridyldiamido and quinolinyldiamido transition metal complexes in olefin polymerization, there is still a need for further olefin polymerization catalysts having enhanced activity or capability of producing polyolefins having tailored properties, including particular molecular weight ranges, molecular weight distributions, tacticity, or like features at a given reaction temperature.

SUMMARY

This invention relates to transition metal complexes having a formula of

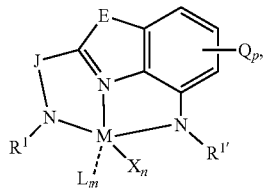

In said formula, M is a transition metal; E is $NR^2$, $CR^3R^4$, O, S, or $SiR^5R^6$; Q is optional substitution selected from the group consisting of a hydrocarbyl group, a heteroatom substituent, and any combination thereof; p is an integer ranging from 0 to 3; L is an optional neutral ligand, with two L optionally being joined together to form a bidentate neutral ligand; m is an integer ranging from 0 to 3; X is an anionic leaving group, with two X optionally being joined together to form a dianionic leaving group; n is 1 or 2, wherein a sum of m+n is 4 or less; J is a linker group contributing two or three atoms that are located within a first chelate ring; $R^1$ and $R^{1'}$ are independently selected from the group consisting of a hydrocarbyl group and a trihydrocarbylsilyl group; $R^2$ is a hydrocarbyl group; $R^3$ and $R^4$ are independently selected from the group consisting of H, a hydrocarbyl group, and a trihydrocarbylsilyl group; and $R^5$ and $R^6$ are independently a hydrocarbyl group. In particular embodiments, $R^1$ and $R^{1'}$ are independently selected from the group consisting of an alkyl group, an aryl group, and a trihydrocarbylsilyl group; $R^2$ is an alkyl group or an aryl group; $R^3$ and $R^4$ are independently selected from the group consisting of H, an alkyl group, an aryl group, and a trihydrocarbylsilyl group; and $R^5$ and $R^6$ are independently selected from the group consisting of an alkyl group and an aryl group.

This invention also relates to catalyst systems. The catalyst systems comprise at least one activator and a transition metal complex having a formula of

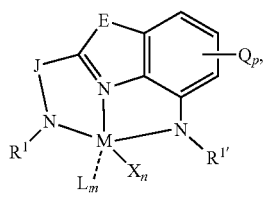

In said formula, M is a transition metal; E is $NR^2$, $CR^3R^4$, O, S, or $SiR^5R^6$; Q is optional substitution selected from the group consisting of a hydrocarbyl group, a heteroatom substituent, and any combination thereof; p is an integer ranging from 0 to 3; L is an optional neutral ligand, with two L optionally being joined together to form a bidentate neutral ligand; m is an integer ranging from 0 to 3; X is an anionic leaving group, with two X optionally being joined together to form a dianionic leaving group; n is 1 or 2, wherein a sum of m+n is 4 or less; J is a linker group contributing two or three atoms that are located within a first chelate ring; $R^1$ and $R^{1'}$ are independently selected from the group consisting of a hydrocarbyl group and a trihydrocarbylsilyl group; $R^2$ is a hydrocarbyl group; $R^3$ and $R^4$ are independently selected from the group consisting of H, a hydrocarbyl group, and a trihydrocarbylsilyl group; and $R^5$ and $R^6$ are independently a hydrocarbyl group. In particular embodiments, $R^1$ and $R^{1'}$ are independently selected from the group consisting of an alkyl group, an aryl group, and a trihydrocarbylsilyl group; $R^2$ is an alkyl group or an aryl group; $R^3$ and $R^4$ are independently selected from the group consisting of H, an alkyl group, an aryl group, and a trihydrocarbylsilyl group; and $R^5$ and $R^6$ are independently selected from the group consisting of an alkyl group and an aryl group.

This invention also relates to polymerization methods using the transition metal complexes. The methods comprise providing an olefinic feed, and contacting a catalyst system with the olefinic feed under polymerization reaction conditions. The catalyst system comprises at least one activator and a transition metal complex having a formula of

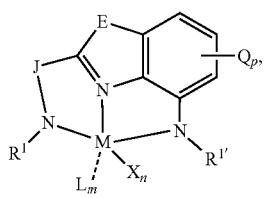

In said formula, M is a transition metal; E is $NR^2$, $CR^3R^4$, O, S, or $SiR^5R^6$; Q is optional substitution selected from the group consisting of a hydrocarbyl group, a heteroatom substituent, and any combination thereof; p is an integer ranging from 0 to 3; L is an optional neutral ligand, with two L optionally being joined together to form a bidentate neutral ligand; m is an integer ranging from 0 to 3; X is an anionic leaving group, with two X optionally being joined together to form a dianionic leaving group; n is 1 or 2, wherein a sum of m+n is 4 or less; J is a linker group contributing two or three atoms that are located within a first chelate ring; $R^1$ and $R^{1'}$ are independently selected from the group consisting of a hydrocarbyl group and a trihydrocarbylsilyl group; $R^2$ is a hydrocarbyl group; $R^3$ and $R^4$ are independently selected from the group consisting of H, a hydrocarbyl group, and a trihydrocarbylsilyl group; and $R^5$ and $R^6$ are independently a hydrocarbyl group. In particular embodiments, $R^1$ and $R^{1'}$ are independently selected from the group consisting of an alkyl group, an aryl group, and a trihydrocarbylsilyl group; $R^2$ is an alkyl group or an aryl group; $R^3$ and $R^4$ are independently selected from the group consisting of H, an alkyl group, an aryl group, and a trihydrocarbylsilyl group; and $R^5$ and $R^6$ are independently selected from the group consisting of an alkyl group and an aryl group.

The invention also relates to transition metal complexes selected from among the following:

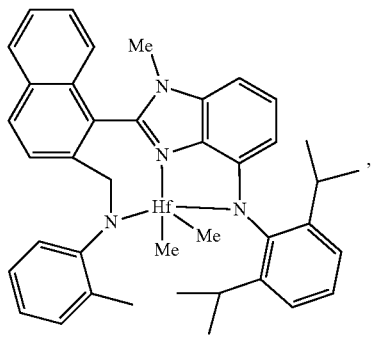

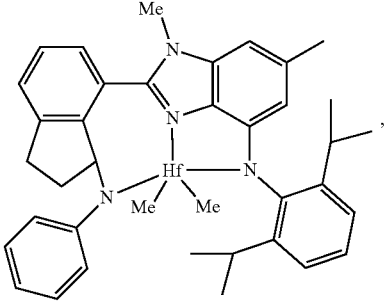

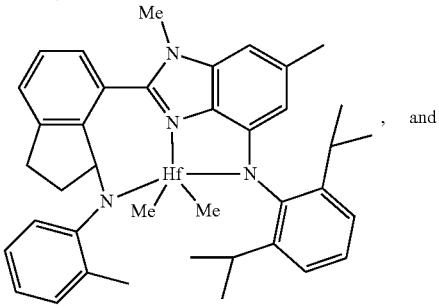

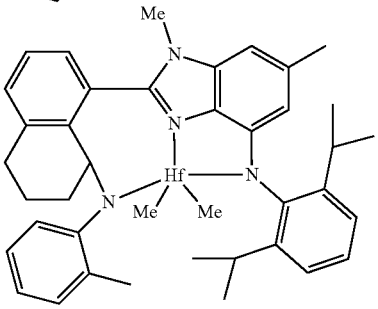

BRIEF DESCRIPTION OF THE DRAWINGS

Not applicable.

DETAILED DESCRIPTION

The present disclosure generally relates to polymerization and, more specifically, benzazole and pseudoindole diamido transition metal complexes and use thereof in polymerization reactions.

Transition metal complexes featuring a tridentate ligand comprising two amido ligands and a heterocyclic nitrogen ligand are described herein. In particular, the tridentate ligands are constructed upon a benzazole or pseudoindole scaffold, which provides the heterocyclic nitrogen atom, with the two amido ligands being appended at different lengths from the heterocyclic nitrogen atom. The two amido ligands form two chelate rings upon complexation of a transition metal atom, with the two chelate rings having different ring sizes and being non-planar with respect to one another. In particular embodiments, the two amido ligands may be positioned with respect to the heterocyclic nitrogen atom such that one of the chelate rings is a five-membered chelate ring and the other chelate ring is a six- or seven-membered chelate ring, with a seven-membered chelate ring being preferred. Suitable benzazole scaffolds that may be present in the transition metal complexes disclosed herein include, for example, benzimidazole, benzoxazole, benzothiazole, and related compounds. Further structural details of the tridentate ligands and transition metal complexes formed therefrom are provided below.

Catalyst systems comprising the transition metal complexes are also described in various embodiments of the present disclosure. The catalyst systems comprise the transition metal complexes in combination with at least one activator, wherein the activator leads to formation of a reactive species that is effective for promoting olefin polymerization. Suitable activators may include, for example, alkyl aluminum compounds, alumoxanes, boranes, or borates, with some examples of the latter compounds being non-coordinating anion activators. Activators such as alumoxanes and non-coordinating anion borates may be preferred. Although any transition metal may be present in the complexes, group 4 metals (e.g., Ti, Zr and Hf) may be especially effective for promoting olefin polymerization, with Hf being preferred in various instances.

The benzazole and pseudoindole diamido transition metal complexes disclosed herein may be broadly characterized in terms of the structure shown in Formula 1 below.

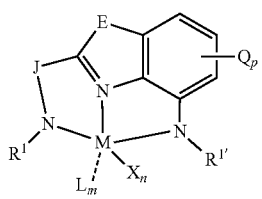

Formula 1

In said formula, M is a transition metal; E is $NR^2$, $CR^3R^6$, O, S, or $SiR^5R^6$; Q is optional substitution selected from the group consisting of a hydrocarbyl group, a heteroatom substituent, and any combination thereof; p is an integer ranging from 0 to 3; L is an optional neutral ligand, with two L optionally being joined together to form a bidentate neutral ligand; m is an integer ranging from 0 to 3; X is an anionic leaving group, with two X optionally being joined together to form a dianionic leaving group; n is 1 or 2, wherein a sum of m+n is 4 or less; J is a linker group contributing two or three atoms that are located within a first chelate ring; $R^1$ and $R^{1'}$ are independently selected from the group consisting of a hydrocarbyl group and a trihydrocarbylsilyl group; $R^2$ is a hydrocarbyl group; $R^3$ and $R^4$ are independently selected from the group consisting of H, a hydrocarbyl group, and a trihydrocarbylsilyl group; and $R^5$ and $R^6$ are independently a hydrocarbyl group.

The benzazole and pseudoindole tridentate ligands disclosed herein may be differentiated in several ways from the pyridyldiamido and quinolinyldiamido tridentate ligands disclosed in U.S. Pat. Nos. 7,973,116, 8,674,040, and 9,249, 238 and in US Patent Application Publication 2018/0002352. Not only are different heteroaromatic scaffolds present in the complexes of the present disclosure, but a different relative orientation of the two amido ligands is provided by the manner of attachment of linker group J to the heteroaromatic scaffold. Namely, pyridyldiamido and quinolinyldiamido ligands of the prior art feature a nominal sixty degree interior angle within their six-membered heteroaromatic ring, whereas the benzazole and pseudoindole tridentate ligands disclosed herein feature a nominal seventy-two degree interior angle. The differing heteroaromatic ring interior angle in the present disclosure alters the exterior angle at which linker group J and its appended amido ligand project from the heteroaromatic ring, thereby potentially changing the orientation of the corresponding chelate ring within the transition metal complexes. Thus, chelate rings having one or more ring atoms contributed by linker group J may feature a range of ring sizes (both six- and seven-membered chelate rings) in the complexes of the present disclosure, which still maintain catalytic activity. Additional tailoring of the projection angle may be afforded by selecting a particular five-membered heteroaromatic ring, and its variable atom, within the heteroaromatic scaffold. Accordingly, the tridentate transition metal complexes of the present disclosure offer opportunities for catalyst tailoring that are not feasible with existing pyridyldiamido and quinolinyldiamido catalysts. The opportunity for catalyst tailoring may afford polyolefins having properties that are not presently attainable using existing pyridyldiamido and quinolinyldiamido transition metal catalysts.

All numerical values within the detailed description and the claims herein are modified by "about" or "approximately" with respect to the indicated value, and take into account experimental error and variations that would be expected by a person having ordinary skill in the art. Unless otherwise indicated, room temperature is about 23° C.

As used in the present disclosure and claims, the singular forms "a," "an," and "the" include plural forms unless the context clearly dictates otherwise.

For the purposes of the present disclosure, the new numbering scheme for groups of the Periodic Table is used. In said numbering scheme, the groups (columns) are numbered sequentially from left to right from 1 through 18, excluding the f-block elements (lanthanides and actinides). Under this scheme, the term "transition metal" refers to any atom from groups 3-12 of the Periodic Table, inclusive of the lanthanides and actinide elements. Ti, Zr and Hf are group 4 transition metals.

As used herein, Mn is number average molecular weight, Mw is weight average molecular weight, and Mz is z average molecular weight, wt. % is weight percent, and mol. % is mole percent. Molecular weight distribution (MWD), also referred to as polydispersity index (PDI), is defined to be Mw divided by Mn. Unless otherwise noted, all molecular weight units (e.g., Mw, Mn, and Mz) are in unit of g/mol (g mol$^{-1}$).

For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt. % to 55 wt. %, it is understood that the mer unit in the copolymer is derived from ethylene in the polymerization reaction and said derived units are present at 35 wt. % to 55 wt. %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different," as used to refer to mer units, indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol. % ethylene derived units, a "propylene polymer" or "propylene copolymer" is a polymer or copolymer comprising at least 50 mol. % propylene derived units, and so on.

As used in the present disclosure and claims, Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Cy is cyclohexyl, Oct is octyl, Ph is phenyl, and Bn is benzyl, MAO is methylalumoxane.

The term "hydrocarbon" refers to a class of compounds having hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different numbers of carbon atoms. The term "$C_n$," refers to hydrocarbon(s) or a hydrocarbyl group having n carbon atom(s) per molecule or group, wherein n is a positive integer. Such hydrocarbon compounds may be one or more of linear, branched, cyclic, acyclic, saturated, unsaturated, aliphatic, or aromatic, with optional substitution being present in some cases.

The terms "hydrocarbyl" and "hydrocarbyl group" are used interchangeably herein. The term "hydrocarbyl group" refers to any $C_1$-$C_{100}$ hydrocarbon group bearing at least one unfilled valence position when removed from a parent compound. Suitable "hydrocarbyl" and "hydrocarbyl groups" may be optionally substituted. The term "hydrocarbyl group having 1 to about 100 carbon atoms" refers to an optionally substituted moiety selected from a linear or branched $C_1$-$C_{100}$ alkyl, a $C_3$-$C_{100}$ cycloalkyl, a $C_6$-$C_{100}$ aryl, a $C_2$-$C_{100}$ heteroaryl, a $C_1$-$C_{100}$ alkylaryl, a $C_7$-$C_{100}$ arylalkyl, and any combination thereof.

The term "trihydrocarbylsilyl" refers to a silicon atom having three valence positions bonded to hydrocarbyl groups, with a fourth valence position either being open or bonded to a hydrocarbyl group or to a heteroatom, such as nitrogen.

The term "substituted" refers to replacement of at least one hydrogen atom or carbon atom of a hydrocarbon or hydrocarbyl group with a heteroatom or heteroatom functional group. Heteroatoms may include, but are not limited to, B, O, N, S, P, F, Cl, Br, I, Si, Pb, Ge, Sn, As, Sb, Se, and Te. Heteroatom functional groups that may be present in substituted hydrocarbons or hydrocarbyl groups include, but are not limited to, functional groups such as O, S, S═O, S(═O)$_2$, NO$_2$, F, Cl, Br, I, NR$_2$, OR, SeR, TeR, PR$_2$, AsR$_2$, SbR$_2$, SR, BR$_2$, SiR$_3$, GeR$_3$, SnR$_3$, PbR$_3$, where R is a hydrocarbyl group or H. Suitable hydrocarbyl R groups may include alkyl, alkenyl, alkynyl, aryl, heteroaryl, cycloalkyl, heterocyclyl, and the like, any of which may be optionally substituted.

The term "optionally substituted" means that a hydrocarbon or hydrocarbyl group may be unsubstituted or substituted. For example, the term "optionally substituted hydrocarbyl" refers to replacement of at least one hydrogen atom or carbon atom in a hydrocarbyl group with a heteroatom or heteroatom functional group. Unless otherwise specified, any of the hydrocarbyl groups herein may be optionally substituted.

The terms "linear" or "linear hydrocarbon" refer to a hydrocarbon or hydrocarbyl group having a continuous carbon chain without side chain branching, in which the continuous carbon chain may be optionally substituted.

The terms "cyclic" or "cyclic hydrocarbon" refer to a hydrocarbon or hydrocarbyl group having a closed carbon ring, which may be optionally substituted.

The terms "branched" or "branched hydrocarbon" refer to a hydrocarbon or hydrocarbyl group having a linear carbon chain or a closed carbon ring, in which a hydrocarbyl side chain extends from the linear carbon chain or the closed carbon ring. Optional substitution may be present in the linear carbon chain, the closed carbon ring, and/or the hydrocarbyl side chain.

The terms "saturated" or "saturated hydrocarbon" refer to a hydrocarbon or hydrocarbyl group in which all carbon atoms are bonded to four other atoms, with the exception of an unfilled valence position being present upon carbon in a hydrocarbyl group.

The terms "unsaturated" or "unsaturated hydrocarbon" refer to a hydrocarbon or hydrocarbyl group in which one or more carbon atoms are bonded to less than four other atoms, exclusive of an open valence position upon carbon being present. That is, the term "unsaturated" refers to a hydrocarbon or hydrocarbyl group bearing one or more double and/or triple bonds, with the double and/or triple bonds being between two carbon atoms and/or between a carbon atom and a heteroatom.

The terms "aromatic" or "aromatic hydrocarbon" refer to a hydrocarbon or hydrocarbyl group having a cyclic arrangement of conjugated pi-electrons that satisfies the Hückel rule.

The term "alkyl" refers to a hydrocarbyl group having no unsaturated carbon-carbon bonds, and which may be optionally substituted.

The term "aryl" is equivalent to the term "aromatic" as defined herein. The term "aryl" refers to both aromatic compounds and heteroaromatic compounds, which may be optionally substituted. Both mononuclear and polynuclear aromatic compounds are encompassed by these terms.

The terms "heteroaryl" and "heteroaromatic" refer to an aromatic ring containing a heteroatom and which satisfies the Hückel rule.

The term "perfluoroalkyl" refers to an alkyl group that has at least a majority of its hydrogen atoms replaced with fluorine atoms, and more typically all of its hydrogen atoms replaced with fluorine atoms.

The term "perfluoroaryl" refers to an aryl group that has at least a majority of its hydrogen atoms replaced with fluorine atoms, and more typically all of its hydrogen atoms replaced with fluorine atoms.

The term "independently," when referenced to selection of multiple items from within a given Markush group, means that the selected choice for a first item does not necessarily influence the choice of any second or subsequent item. That is, independent selection of multiple items within a given Markush group means that the individual items may be the same or different from one another.

Examples of saturated hydrocarbyl groups include, but are not limited to, methyl, ethyl, n-propyl, isopropyl, n-butyl, isobutyl, sec-butyl, tert-butyl, pentyl, iso-amyl (isopentyl), neopentyl, hexyl, octyl cyclopropyl, cyclobutyl, cyclopentyl, cyclohexyl, cyclooctyl, and the like, including their substituted analogues. Examples of unsaturated hydrocarbyl groups include, but are not limited to, ethenyl, propenyl, allyl, 1,4-butadienyl, cyclopropenyl, cyclobutenyl, cyclopentenyl, cyclohexenyl, cyclooctenyl and the like, including their substituted analogues.

The terms "alkene" and "olefin" are used synonymously herein. Similarly, the terms "alkenic" and "olefinic" are used synonymously herein. Unless otherwise noted, all possible geometric isomers are encompassed by these terms.

Examples of aromatic hydrocarbyl groups include, but are not limited to, phenyl, tolyl, xylyl, naphthyl, and the like. Heteroaryl and polynuclear heteroaryl groups may include, but are not limited to, pyridyl, quinolinyl, isoquinolinyl, pyrimidinyl, quinazolinyl, acridinyl, pyrazinyl, quinoxalinyl, imidazolyl, benzimidazolyl, pyrazolyl, benzopyrazolyl, oxazolyl, benzoxazolyl, isoxazolyl, benzisoxazolyl, imidazolinyl, thiophenyl, benzothiophenyl, furanyl and benzofuranyl. Polynuclear aryl groups may include, but are not limited to, naphthalenyl, anthracenyl, indanyl, indenyl, and tetralinyl.

The term "catalyst system" refers to the combination of a transition metal complex and at least one activator. When used to describe such a combination before activation, the term "catalyst system" is understood to mean the unactivated transition metal complex (precatalyst) together with the activator and, optionally, a co-activator. When used to describe such a combination after activation, the term "catalyst system" is understood to mean the activated complex and the activator or other charge-balancing moiety.

The term "benzazole" refers to a heteroaromatic ring system in which a five-membered heteroaromatic ring containing nitrogen and at least one additional heteroatom is fused to a benzene ring. Illustrative benzazole rings suitable for use as a heteroaromatic scaffold in the present disclosure include, for example, benzimidazole, benzoxazole, and benzothiazole, any of which may be optionally substituted.

The term "pseudoindole" is synonymous with the term 3H-indole and refers to a 5-membered heteroaromatic ring bearing a double-bonded ring nitrogen atom at the 1-position and a group 14 ring atom at the 3-position. Illustrative pseudoindole rings suitable for use as a heteroaromatic scaffold in the present disclosure include pseudoindole and 3-silapseudoindole.

Referring again to Formula 1, suitable transition metals may include any group 3 to group 12 metal atom, inclusive of lanthanide and actinide elements. Illustrative transition metals M that may be suitable include, for example, Sc, Ti, Zr, Hf, V, Nb, Ta, Mn, Re, Fe, Ru, Os, Co, Rh, Ir, and Ni. Particularly suitable transition metals M may be group 4 transition metals, such as Ti, Zr or Hf, with Hf being particularly suitable in the complexes disclosed herein. Hf may be particularly preferable for promoting olefin polymerization reactivity in the various embodiments of the present disclosure. The oxidation state of the selected transition metal may range from 0 to +7, with an oxidation state of +3 or +4 being preferred, preferably +4. The ligands bound to the transition metal and the oxidation state of the transition metal may be selected such that the complexes are electrically neutral, unless otherwise indicated.

The transition metal complexes disclosed herein feature a first amido ligand and a second amido ligand, wherein the first amido ligand is bound to the benzazole ring or the pseudoindole ring via linker group J and the second amido ligand is bound directly to the benzazole ring or the pseudoindole ring (i.e., directly to the phenyl ring of the benzazole or pseudoindole ring). The first and second amido ligands bear functionalization $R^1$ and $R^{1'}$, respectively, which may be a hydrocarbyl group or trihydrocarbylsilyl group selected as above. In particular embodiments, $R^1$ and $R^{1'}$ are independently selected from the group consisting of an alkyl group, an aryl group, and a trihydrocarbylsilyl group, any of which may be optionally substituted. Preferably, $R^1$ and $R^{1'}$ are each an aryl group. In still more particular embodiments, $R^1$ and $R^{1'}$ are both the same aryl group, and in still more particular embodiments, $R^1$ and $R^{1'}$ are both the same aryl group, each bearing 2,6-substitution. Preferably, $R^1$ and $R^{1'}$ each bear 2,6-hydrocarbyl substitution. The hydrocarbyl substitution may be any $C_1$-$C_{30}$ hydrocarbyl group, which may be linear, branched or cyclic, saturated or unsaturated, and/or aromatic or aliphatic. Other suitable optionally substituted aryl groups may include those bearing zero to five substituents in any position upon the aromatic ring and selected among, for example, F, Cl, Br, I, $OCF_3$, $CF_3$, $NO_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof. Branched alkyl groups such as isopropyl, isobutyl, t-butyl, isopentyl, or neopentyl may also be present. Similarly, cyclic alkyl groups such as cyclopropyl, cyclobutyl, cyclopentyl, or cyclohexyl may be present.

In particular embodiments, $R^2$ is an alkyl group or an aryl group, any of which may be optionally substituted. Preferably, $R^2$ is an optionally substituted alkyl group. The optionally substituted alkyl group may be linear, branched or cyclic, saturated or unsaturated, and/or aromatic or aliphatic and may contain 1 to about 30 carbon atoms. More preferably, $R^2$ is methyl.

In particular embodiments, $R^3$ and $R^4$ are independently selected from the group consisting of H, an alkyl group, an aryl group, and a trihydrocarbylsilyl group, any of which (other than H) may be optionally substituted. Suitable alkyl groups may be linear, branched or cyclic, saturated or unsaturated, and/or aromatic or aliphatic and may contain 1 to about 30 carbon atoms. Suitable aryl groups may contain 3 to about 30 carbon atoms and may be monocyclic, polycyclic, heteroaromatic, or any combination thereof. Suitable trihydrocarbylsilyl groups may contain any $C_1$-$C_{30}$ hydrocarbyl group, which may be linear, branched or cyclic, saturated or unsaturated, and/or aromatic or aliphatic. $R^3$ and $R^4$ may be joined to form a spiro ring in some embodiments.

In particular embodiments, $R^5$ and $R^6$ are independently selected from the group consisting of an alkyl group and an aryl group, any of which may be optionally substituted. Suitable alkyl groups may be linear, branched or cyclic, saturated or unsaturated, and/or aromatic or aliphatic and may contain 1 to about 30 carbon atoms. Suitable aryl groups may contain 3 to about 30 carbon atoms and may be monocyclic, polycyclic, heteroaromatic, or any combination thereof. $R^5$ and $R^6$ may be joined to form a spiro ring in some embodiments.

In still more particular embodiments, $R^1$ and $R^{1'}$ are independently selected from the group consisting of an alkyl group, an aryl group, and a trihydrocarbylsilyl group; $R^2$ is an alkyl group or an aryl group; $R^3$ and $R^4$ are independently selected from the group consisting of H, an alkyl group, an aryl group, and a trihydrocarbylsilyl group; and $R^5$ and $R^6$ are independently selected from the group consisting of an alkyl group and an aryl group. Any of such groups other than H may be optionally substituted, with particularly suitable groups being listed above.

The benzazole or pseudoindole groups within the transition metal complexes of the present disclosure may bear optional substitution on the aromatic ring portion of the heteroaromatic scaffold, as denoted by $Q_p$ in Formula 1. Optional substitution Q, when present, may be selected from any combination of a hydrocarbyl group and a heteroatom substituent. In a benzazole or pseudoindole heteroaromatic scaffold, up to 3 optional substitutions Q may be present upon the aromatic ring (i.e., p is 0, 1, 2, or 3). Suitable hydrocarbyl groups may include, for example, any $C_1$-$C_{30}$ hydrocarbyl group, which may be linear, branched or cyclic, saturated or unsaturated, and/or aromatic or aliphatic. Suitable heteroatom substituents may include any heteroatom or heteroatom-containing functional group such as, for example, halogen, phenol, alkoxy, aryloxy, thio, thioether, amino, substituted amino, silyl, carboxylic acid, carboxamide, carboxylic ester, nitrile, or the like. Two or more optional substitutions Q, when located upon adjacent carbon atoms, may be joined to form a ring in certain embodiments, wherein the ring may be aromatic, aliphatic, and/or heterocyclic. Any carbon atoms upon the aromatic ring of the heteroaromatic scaffold that lack an optional substitution Q are bound to a hydrogen atom.

Particular examples of transition metal complexes of the present disclosure featuring coordination with a heterocyclic nitrogen atom located in a heteroaromatic scaffold may include those containing a benzimidazole ring ($E=NR^2$), a benzoxazole ring ($E=O$), a benzothiazole ring ($E=S$), a pseudoindole ring ($E=CR^3R^4$), or a silapseudoindole ring ($E=SiR^5R^6$). In particularly preferred examples, the heterocyclic nitrogen atom may be located within a benzimidazole ring ($E=NR^2$), such that the transition metal complexes of the present disclosure have a structure corresponding to Formula 2 below,

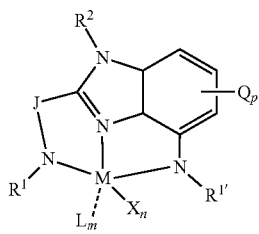

Formula 2 wherein the variables are defined as above. In particular embodiments of such benzimidazole diamido ligands, $R^2$ may be an alkyl group, particularly a $C_1$-$C_{30}$ or $C_1$-$C_{10}$ alkyl group, and more particularly a methyl group.

The transition metal complexes of the present disclosure feature two chelate rings. A first chelate rings contains a first amido ligand and linker group J. The first chelate ring may be a six- or seven-membered chelate ring. A second chelate ring contains a second amido ligand and may be a five-membered chelate ring.

Accordingly, linker group J may be any group that contributes at least two atoms into the first chelate ring containing J. The count of the incorporated atoms represent the number of atoms defining the ring size and does not include atoms within branches or side chains depending from the ring. In some embodiments, linker group J may contribute three atoms to the first chelate ring containing J. Such linker groups J may be referred to herein as three-atom linker groups J. In particular embodiments, suitable three-atom linker groups J may comprise an aromatic group. Particularly suitable three-atom linker groups J may include moieties such as, for example, those shown in Formulas 3-8 below.

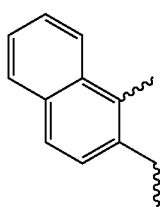

Formula 3

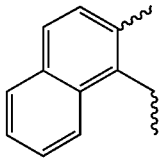

Formula 4

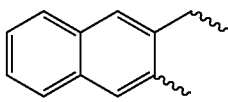

Formula 5

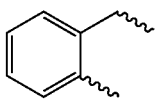

Formula 6

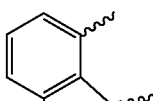

Formula 7

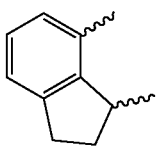

Formula 8

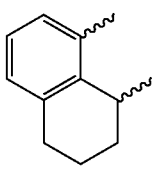

Other suitable three-atom linker groups J may include those shown in Formulas 9-18 below.

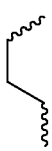

Formula 9

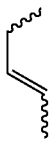

Formula 10

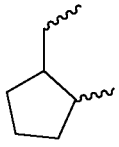

Formula 11

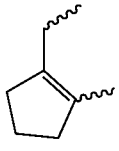

Formula 12

Formula 13

-continued

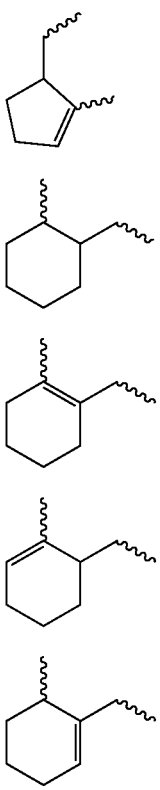

In other embodiments, linker group J may contribute two atoms to the first chelate ring containing J. Such linker groups J may be referred to herein as two-atom linker groups J. Particularly suitable two-atom linker groups J may include moieties such as, for example, those shown in Formulas 19-27 below.

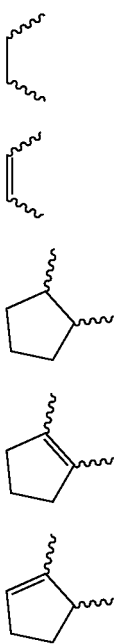

Formula 19

Formula 20

Formula 21

Formula 22

Formula 23

Formula 14

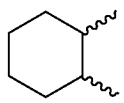

Formula 15

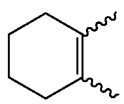

Formula 16

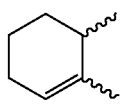

Formula 17

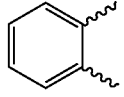

Formula 18

Formula 24

Formula 25

Formula 26

Formula 27

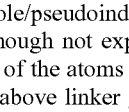

Each wavy bond in Formulas 3-27 indicates a point of connectivity within the first chelate ring. The linker groups J may be incorporated in either direction within the first chelate ring. That is, linker groups J defined in Formulas 3-27 may feature either wavy bond connected to the benzazole/pseudoindole ring and to the first amido ligand. Although not expressly shown, it is to be appreciated that any of the atoms establishing a point of connectivity within the above linker groups J (Formulas 3-27) may comprise a heteroatom, such as silicon or substituted silicon, which is attached to the first amido ligand.

Each anionic leaving group X in Formulas 1 and 2 may be selected from among σ-bonded ligands that either convey innate catalytic activity to the transition metal complexes or are readily displaced in the presence of an activator to form a catalytically active species. In some embodiments, each X may be independently selected from an optionally substituted hydrocarbyl group having 1 to about 20 carbon atoms, where the optionally substituted hydrocarbyl group may be linear, branched or cyclic, saturated or unsaturated, and/or aliphatic or aromatic. Suitable examples of anionic leaving group X may include alkyl, aryl, perfluoroalkyl, perfluoroaryl, alkoxy, aryloxy, perfluoroalkoxy, or perfluoroaryloxy groups. Particularly suitable examples of anionic leaving group X may include any $C_1$ to $C_{12}$ alkyl group (such as methyl, ethyl, propyl, butyl, butyl, pentyl, hexyl, heptyl, octyl, nonyl, decyl, undecyl, dodecyl, and the isomers thereof), $C_2$ to $C_{12}$ alkenyl groups, $C_3$ to $C_8$ cycloalkyl groups, $C_6$ to $C_{12}$ aryl groups (such as phenyl), $C_7$ to $C_{20}$ alkylaryl groups, $C_1$ to $C_{12}$ alkoxy groups, $C_6$ to $C_{16}$ aryloxy groups, $C_7$ to $C_{16}$ alkylaryloxy groups, $C_1$ to $C_{12}$ haloalkyl groups, $C_6$ to $C_{12}$ haloaryl groups, $C_1$ to $C_{12}$ perfluoroalkyl groups, $C_6$ to $C_{12}$ perfluoroaryl groups, $C_1$ to $C_{12}$ haloalkoxy groups, $C_6$ to $C_{12}$ haloaryloxy groups, $C_1$ to $C_{12}$ perfluoroalkoxy groups, $C_6$ to $C_{12}$ perfluoroaryloxy groups, and the like. Optionally two anionic leaving groups X may be joined to each other to form a dianionic leaving group, such as an alkylene group. The term "alkylene" refers to a hydrocarbyl group bearing two open valences when removed from a parent compound. The alkylene may be cyclic, acyclic, linear, or branched.

In various embodiments, optional neutral ligand L may be a neutral Lewis base, such as an ether, thioether, or amine. Up to 3 neutral ligands may be present (i.e., m is 0, 1, 2 or 3).

Scheme 1 below shows a general synthetic route through which the transition metal complexes of the present disclosure may be prepared using multi-step syntheses.

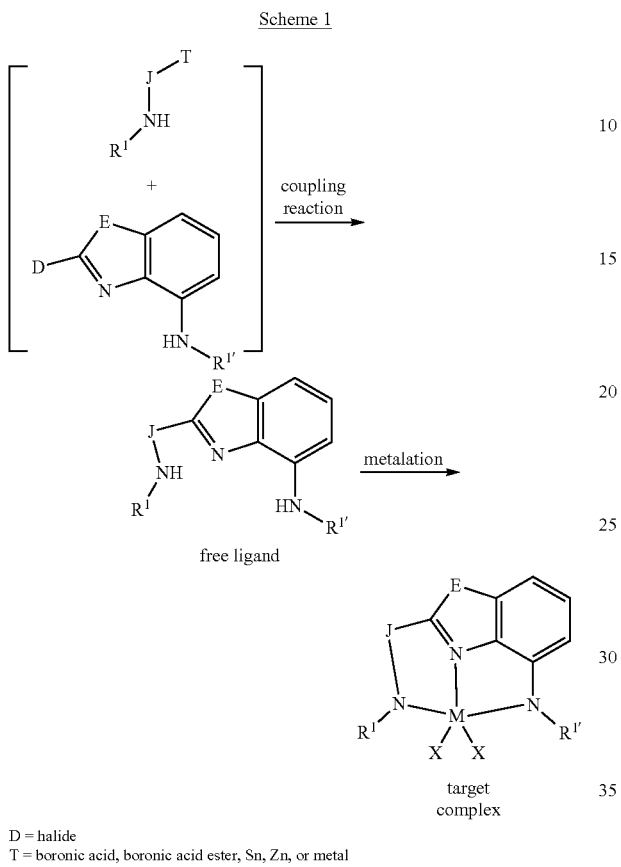

D = halide
T = boronic acid, boronic acid ester, Sn, Zn, or metal

As shown in Scheme 1, the free ligand may be synthesized through coupling of an amine fragment bearing reactive functionality T and a heterocyclic amine bearing a halide, thereby forming a bond between bridging group J and the heterocycle. Various coupling strategies may be employed, with Pd being particularly useful in this respect. Pd-catalyzed couplings that may be useful include, for example, Suzuki, Negishi, Kumada, and Stille couplings. Either of the amine groups may be protected prior to the coupling step. Common protecting groups that may be suitable in this respect include, for example, benzyl, tert-butyloxycarbonyl, carbobenzyloxy, p-methoxybenzylcarbonyl, carbamates, and dimethoxybenzyl. The transition metal complex may be prepared from the free ligand in a metalation step, which may be performed by several different methods. One suitable method is to react the free ligand with a basic organometallic species to form the target complex by deprotonation of the amines within the free ligand. Examples of group 4 basic organometallic species that may be used for this type of reaction include, for instance, $MMe_4$, $M(CH_2Ph)_4$, $M(CH_2Ph)_2Cl_2$(ether), $M(N(alkyl)_2)_4$, $M(N(alkyl)_2)_2Cl_2$, where M=Ti, Zr, or Hf. The basic organometallic species may be generated in situ or be isolated prior to use. A second method to generate the target complex from the free ligand is to deprotonate the free ligand with an added base to form a dianionic diamido ligand that may be subsequently reacted with a transition metal compound to form the target transition metal complex. Examples of bases that may be suitable to deprotonate the free ligand include, for example, group 1 and group 2 organometallics and amides. Specific examples of suitable organometallic bases include, for example, BuLi, $K(CH_2Ph)$, MeLi, $^iPrMgBr$, $^iPrMgCl$, $Bu_2Mg$, and lithium diisopropylamide (LDA). These bases may be generated in situ or be isolated prior to use. Examples of transition metal compounds that may be suitable for this application include, for example, group 4 halides, carboxylates, acetylacetonates, trifluoromethanesulfonates (triflates), and alkylsulfonates.

Particularly suitable examples of transition metal complexes of the present disclosure include those specified in Formulas 28-31 below.

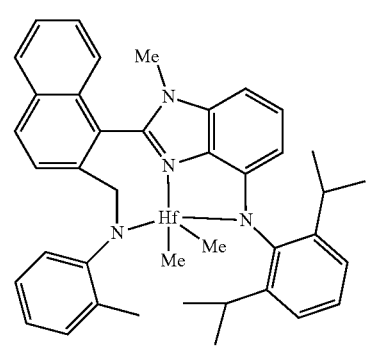

Formula 28

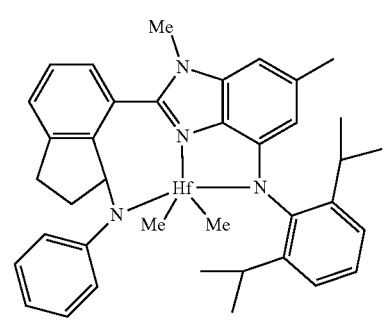

Formula 29

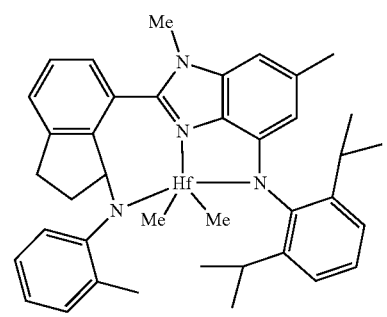

Formula 30

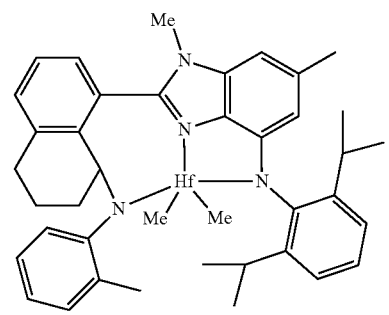

Formula 31

The present disclosure also provides catalyst systems comprising any of the transition metal complexes described hereinabove. More specifically, the catalyst systems of the present disclosure comprise at least one activator and a transition metal complex having Formula 1, wherein the variables in Formula 1 are described in more detail above. Without being bound by any theory or mechanism, the at least one activator may react with the transition metal complexes to promote loss of a ligand to open a coordination site at which polymerization of an olefinic monomer may occur. In particular, the at least one activator is believed to remove at least one of the anionic leaving groups to form a catalytically active species.

According to more specific embodiments, suitable activators for the transition metal complexes of the present disclosure may comprise an alumoxane. Suitable alumoxanes are not considered to be especially limited, provided that they allow a polymerization reaction to occur upon contacting a polymerizable monomer, such as one or more olefinic monomers, as described herein. In more particular embodiments, methylalumoxane may be an especially suitable alumoxane for use in combination with the transition metal complexes disclosed herein.

Without being bound by any theory or mechanism, upon undergoing activation, a polymerizable monomer (e.g., an olefinic monomer) may then be bonded to the transition metal center at an open first coordination site. Subsequent bonding of another molecule of the polymerizable monomer at an open second coordination site may then allow olefin insertion to take place upon the monomer bonded at the first coordination site. The polymer chain may then continue growing as subsequent olefin molecules become bonded and undergo insertion.

When the activator is an alumoxane, the maximum amount of activator typically is set at up to a 5,000-fold molar excess (Al:M) over the transition metal complex (per metal catalytic site). The minimum activator-to-transition metal complex is a typically 1:1 molar ratio. Alternate preferred ranges include from 1:1 to 500:1 (Al:M), alternately from 1:1 to 200:1 (Al:M), alternately from 1:1 to 100:1 (Al:M), or alternately from 1:1 to 50:1 (Al:M).

Other suitable activators for transition metal complexes that may be used in conjunction with the disclosure herein include compounds containing a non-coordinating anion, especially borane and borate compounds. Particularly useful borane and borate compounds containing a non-coordinating anion or similar entity include, for example, $B(C_6F_5)_3$, $[PhNMe_2H]^+[B(C_6F_5)_4]^-$, $[Ph_3C]^+[B(C_6F_5)_4]^-$, and $[PhNMe_2H]^+[B(C_{10}F_7)_4]^-$.

A non-coordinating anion (NCA) is defined to mean an anion either that does not coordinate to a transition metal center or that does coordinate to a transition metal center, but only weakly. The term NCA is defined to include multicomponent NCA-containing activators, such as N,N-dimethylanilinium tetrakis(pentafluorophenyl)borate and N,N-dimethylanilinium tetrakis(heptafluoronaphthyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. Typically, NCAs coordinate weakly enough that a neutral Lewis base, such as an olefinically or acetylenically unsaturated monomer can displace it from the catalyst center. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon. The term non-coordinating anion includes neutral activators, ionic activators, and Lewis acid activators.

"Compatible" non-coordinating anions are those which are not degraded to neutrality when the initially formed complex decomposes. Further, the anion does not transfer an anionic substituent or fragment to the cation so as to cause it to form a neutral transition metal compound and a neutral by-product from the anion. Non-coordinating anions useful in accordance with this disclosure are those that are compatible, stabilize the transition metal cation in the sense of balancing its ionic charge at +1, and yet retain sufficient lability to permit displacement during polymerization.

It is within the scope of this invention to use an ionizing, neutral, or ionic activator, such as tri(n-butyl)ammonium tetrakis(pentafluorophenyl)borate, a tris perfluorophenylboron metalloid precursor or a trisperfluoronaphthylboron metalloid precursor, polyhalogenated heteroborane anions (WO 1998/043983), boric acid (U.S. Pat. No. 5,942,459), or any combination thereof. It is also within the scope of this invention to use neutral or ionic activators alone or in combination with alumoxane activators.

The catalyst systems of the present disclosure can include at least one non-coordinating anion (NCA) activator. In preferred embodiments, boron-containing NCA activators represented by Formula 32 below can be used,

$$Z_d^+(A^{d-}) \qquad \text{Formula 32}$$

where Z is (L-H) or a reducible Lewis acid; L is a neutral Lewis base; H is hydrogen; (L-H) is a Bronsted acid; $A^{d-}$ is a boron-containing non-coordinating anion having the charge d−; and d is 1, 2, or 3.

The cation component $Z_d^+$ may include Bronsted acids such as protons or protonated Lewis bases or reducible Lewis acids capable of protonating or abstracting a moiety, such as an alkyl or aryl group from the transition metal complexes, resulting in a cationic transition metal species.

The activating cation $Z_d^+$ may also be a moiety such as silver, tropylium, carboniums, ferroceniums and mixtures thereof, preferably carboniums and ferroceniums. Preferred reducible Lewis acids can be any triaryl carbonium (where the aryl can be substituted or unsubstituted, such as those represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl). Preferably, the reducible Lewis acids in Formula 28 above defined as "Z" include those represented by the formula: $(Ph_3C)$, where Ph is a substituted or unsubstituted phenyl, preferably substituted with $C_1$ to $C_{40}$ hydrocarbyls or substituted a $C_1$ to $C_{40}$ hydrocarbyls, preferably $C_1$ to $C_{20}$ alkyls or aromatics or substituted $C_1$ to $C_{20}$ alkyls or aromatics, and preferably $Z_d^+$ is triphenylcarbonium.

When $Z_d$ is the activating cation $(L-H)_d^+$, it is preferably a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo-N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}G_g]^{d-}$ wherein k is 1, 2, or 3; g is 1, 2, 3, 4, 5, or 6 (preferably 1, 2, 3, or 4); g−k=d; M is an element selected from Group 13 of the Periodic Table of the Elements, preferably boron or aluminum, and G is independently a hydride, bridged or unbridged dialkylamido, halide, alkoxide, aryloxide, hydrocarbyl, substituted hydrocarbyl, halocarbyl, substituted halocarbyl, and halo-substituted hydrocarbyl radicals, said G having up to 20 carbon atoms with the proviso that in not more than 1 occurrence is G a halide. Preferably, each G is a fluorinated hydrocarbyl group having 1 to 20 carbon atoms, more preferably each G is a fluorinated aryl group, and most preferably each G is a pentafluoryl aryl group. Examples of suitable $A^{d-}$ also include diboron compounds as disclosed in U.S. Pat. No. 5,447,895, which is fully incorporated herein by reference.

Illustrative but not limiting examples of boron compounds which may be used as an activator are the compounds described as (and particularly those specifically listed as) activators in U.S. Pat. No. 8,658,556, which is incorporated by reference herein.

Most preferably, the activator $Z_d^+$ ($A^{d-}$) is one or more of N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

Bulky activators are also useful herein as NCAs. "Bulky activator" as used herein refers to anionic activators represented by Formulas 33 or 34 below.

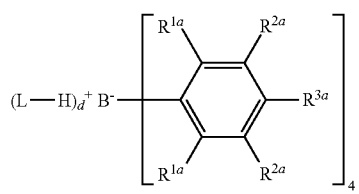

Formula 33

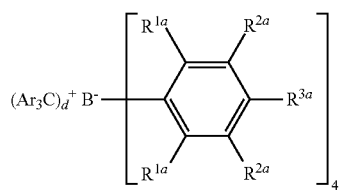

Formula 34

In Formulas 33 and 34, each $R^{1a}$ is, independently, a halide, preferably a fluoride; Ar is substituted or unsubstituted aryl group (preferably a substituted or unsubstituted phenyl), preferably substituted with $C_1$ to $C_{40}$ hydrocarbyls, preferably $C_1$ to $C_{20}$ alkyls or aromatics; each $R^{2a}$ is, independently, a halide, a $C_6$ to $C_{20}$ substituted aromatic hydrocarbyl group or a siloxy group of the formula —O—Si—$R^a$, where $R^a$ is a $C_1$ to $C_{20}$ hydrocarbyl or hydrocarbylsilyl group (preferably $R^{2a}$ is a fluoride or a perfluorinated phenyl group); each $R^{3a}$ is a halide, $C_6$ to $C_{20}$ substituted aromatic hydrocarbyl group or a siloxy group of the formula —O—Si—$R^a$, where $R^a$ is a $C_1$ to $C_{20}$ hydrocarbyl or hydrocarbylsilyl group (preferably $R^{3a}$ is a fluoride or a $C_6$ perfluorinated aromatic hydrocarbyl group); wherein $R^{2a}$ and $R^{3a}$ can form one or more saturated or unsaturated, substituted or unsubstituted rings (preferably $R^{2a}$ and $R^{3a}$ form a perfluorinated phenyl ring); and L is a neutral Lewis base; (L-H)$^+$ is a Bronsted acid; d is 1, 2, or 3; wherein the anion has a molecular weight of greater than 1,020 g/mol; wherein at least three of the substituents on the B atom each have a molecular volume of greater than 250 cubic Å, alternately greater than 300 cubic Å, or alternately greater than 500 cubic Å, as specified below.

Preferably $(Ar_3C)_d^+$ is $(Ph_3C)_d^+$, where Ph is a substituted or unsubstituted phenyl, preferably substituted with $C_1$ to $C_{40}$ hydrocarbyls or substituted $C_1$ to $C_{40}$ hydrocarbyls, preferably $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume. Molecular volume may be calculated as reported in "A Simple "Back of the Envelope" Method for Estimating the Densities and Molecular Volumes of Liquids and Solids," *Journal of Chemical Education*, v. 71(11), November 1994, pp. 962-964. Molecular volume (MV), in units of cubic Å, is calculated using the formula: MV=8.3$V_S$, where $V_S$ is the scaled volume. $V_S$ is the sum of the relative volumes of the constituent atoms, and is calculated from the molecular formula of the substituent using the following listing of relative volumes. For fused rings, the $V_S$ is decreased by 7.5% per fused ring.

| Element | Relative Volume |
|---|---|
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

For a list of particularly useful bulky activators, U.S. Pat. No. 8,658,556, which is incorporated by reference herein, may be consulted.

In another embodiment, one or more of the NCA activators is chosen from the activators described in U.S. Pat. No. 6,211,105. The typical NCA activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

It is also within the scope of this invention that the transition metal complexes can be activated with combinations of alumoxanes and NCAs (see for example, U.S. Pat. Nos. 5,153,157 and 5,453,410; EP 0 573 120 BI, and International Patent Application Publications WO 1994/007928 and WO 1995/014044, which discuss the use of an alumoxane in combination with an ionizing activator).

In some embodiments, the catalyst systems of the present disclosure may be disposed on a solid support. The solid support may allow a catalytic reaction, such as polymerization of an olefinic feed, to be conducted under heterogeneous conditions. In more specific embodiments, the solid support may be silica. Other suitable solid supports may include, but are not limited to, alumina, magnesium chloride, talc, inorganic oxides or chlorides including one or more metals from groups 2, 3, 4, 5, 13 or 14 of the Periodic Table, and polymers such as polystyrene, or functionalized and/or crosslinked polymers. Other inorganic oxides that may suitably function as solid supports include, for example, titania, zirconia, boron oxide, zinc oxide, magnesia, or any combination thereof. Combinations of inorganic oxides may be suitably used as solid supports as well. Illustrative combinations of suitable inorganic oxides include, but are not limited to, silica-alumina, silica-titania, silica-zirconia, silica-boron oxide, and the like.

In some embodiments, an alumoxane or other suitable activator may be disposed on silica or another suitable solid support before being combined with the transition metal complexes disclosed herein. In other embodiments, the transition metal complexes disclosed herein may be disposed upon silica or another suitable support before being combined with an alumoxane or other suitable activator. Upon combining the activator and the solid support with the transition metal complexes, the resulting catalyst system may become disposed upon the solid support. Catalyst systems having different catalytic properties may be obtained depending upon whether the transition metal complex or the activator are supported on the solid support first.

In some embodiments, an alumoxane, such as MAO, may be mixed in an inert solvent such as toluene and then be slurried with a solid support, such as silica. Alumoxane deposition upon the solid support may occur at a temperature from about 60° C. to 120° C., or about 80° C. to 120° C., or about 100° C. to 120° C. Deposition occurring below 60° C., including room temperature deposition, may also be effective.

In some embodiments, suitable solid supports may have a surface area ranging from about 1 $m^2/g$ to about 1,000 $m^2/g$, or about 5 $m^2/g$ to about 900 $m^2/g$, or about 50 $m^2/g$ to about 500 $m^2/g$, or about 100 $m^2/g$ to about 400 $m^2/g$. In some or other embodiments, the solid support may have a pore volume ranging from about 0.01 $cm^3/g$ to about 4 $cm^3/g$, or about 0.1 $cm^3/g$ to about 3 $cm^3/g$, or about 0.8 $cm^3/g$ to about 3 $cm^3/g$, or about 1 $cm^3/g$ to about 2.5 $cm^3/g$. In some or other embodiments, the solid support may have an average particle size ranging from about 0.1 µm low of about 500 µm, or about 0.3 µm to about 400 m, or about 0.5 µm to about 250 µm, or about 1 µm to about 200 µm, or about 5 µm to about 150 µm, or about 10 µm to about 100 µm.

The amount of activator combined with the transition metal complexes in the catalyst systems of the present disclosure can widely vary. In various embodiments, the molar amount of the transition metal complex to the activator can range from about 1:1 to about 100,000:1. For example, the ratio of activator to transition metal complex can range from about 2:1, about 5:1, about 10:1, about 25:1, about 50:1, or about 100:1, up to about 500:1, about 1,000:1, about 5,000:1, or about 10,000:1.

Accordingly, in some or other embodiments of the present disclosure, polymerization methods are also described herein. In more specific embodiments, the polymerization methods of the present disclosure may comprise providing an olefinic feed, which may comprise one or more olefinic monomers, and contacting a catalyst system, as specified herein, with the olefinic feed under polymerization reaction conditions.

Suitable polymerization reaction conditions may include, for example, any high-pressure, solution, slurry and/or gas phase polymerization process. According to more specific embodiments, the catalyst system may be located in a fixed bed, fluidized bed, ebullated bed, slurry bed, trickle bed, or like reactor system when conducting a polymerization reaction.

Polymerization processes of this invention can be carried out in any manner known in the art. Any suspension, homogeneous, bulk, solution, slurry, or gas phase polymerization process known in the art can be used. Such processes can be run in a batch, semi-batch, or continuous mode. The term "continuous" means a system that operates without interruption or cessation. For example a continuous process to produce a polymer would be one where the reactants are continually introduced into one or more reactors and polymer product is continually withdrawn. Homogeneous polymerization processes and slurry processes are useful. A homogeneous polymerization process is defined to be a process where at least 90 wt. % of the product is soluble in the reaction media. A bulk homogeneous process is particularly preferred. A bulk process is defined to be a process where monomer concentration in all feeds to the reactor is 70 vol. % or more. Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is employed and monomers are polymerized on the supported catalyst particles. At least 95 wt. % of polymer products derived from the supported catalyst are in granular form as solid particles (not dissolved in the diluent). A heterogeneous process is defined to be a process where the catalyst system is not soluble in the reaction media.

Other additives may also be used in the polymerization, as desired, such as one or more scavengers, promoters, modifiers, chain transfer agents (such as diethyl zinc), hydrogen, aluminum alkyls, or silanes. Useful chain transfer agents are typically alkylalumoxanes, a compound represented by the formula $AlR_3$, $ZnR_2$ (where each R is, independently, a $C_1$-$C_8$ aliphatic radical, preferably methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof.

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkyl-substituted aromatic compounds, such as benzene, toluene, mesitylene, and xylene. Suitable solvents also include liquid olefins which may act as monomers or co-monomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt. %, preferably less than 0.5 wt. %, preferably less than 0 wt. % based upon the weight of the solvents. Typical temperatures and/or pressures include a temperature in the range of about 0° C. to about 300° C., preferably about 20° C. to about 200° C., preferably about 35° C. to about 150° C., preferably from about 40° C. to about 120° C., preferably from about 45° C. to about 80° C.; and at a pressure in the range of from about 0.35 MPa to about 10 MPa, preferably from about 0.45 MPa to about 6 MPa, or preferably from about 0.5 MPa to about 4 MPa.

In a typical polymerization, the run time of the reaction is up to 300 minutes, preferably in the range of from about 5 to 250 minutes, or preferably from about 10 to 120 minutes. For continuous polymerization processes, the run time may correspond to a residence time in the reactor.

Any olefinic feed can be polymerized using the catalyst systems disclosed herein. Suitable olefinic feeds may include any $C_2$-$C_{40}$ alkene, which may be straight chain or branched, cyclic or acyclic, and terminal or non-terminal, optionally containing heteroatom substitution. In more specific embodiments, the olefinic feed may comprise a $C_2$-$C_{12}$ alkene such, for example, ethene, propene, 1-butene, 2-butene, 1-pentene, cyclopentene, 1-hexene, cyclohexene, 1-octene, 1-decene, 1-dodecene, or any combination thereof. Combinations of ethene and 1-octene may be used in some embodiments. Other suitable monomers may include ethylenically unsaturated monomers, diolefins having 4 to 18 carbon atoms, conjugated or nonconjugated dienes, polyenes, vinyl monomers and cyclic olefins. Non-limiting olefinic monomers may also include norbornene, norbornadiene, isobutylene, isoprene, vinylbenzocyclobutane, styrenes, alkyl substituted styrene, vinyl norbornene, ethylidene norbornene, dicyclopentadiene and cyclopentene. The olefinic feed may comprise any single alkene or any mixture of one or more of the foregoing alkenes.

Preferred olefinic feeds may include $C_2$ to $C_{20}$ alpha-olefins, such as ethylene, propylene, butene, pentene, hexene, heptene, octene, nonene, decene, undecene, docecene or mixtures thereof.

In some embodiments, a copolymer of an olefinic monomer and one or more co-monomers may be produced. In some embodiments, the monomer is propylene and the one or more co-monomers may comprise ethylene or an α-olefin having from 4 to 15 carbon atoms, or from 4 to 12 carbon atoms, or from 4 to 8 carbon atoms. In more specific embodiments, 1-hexene or 1-octene may be a suitable co-monomer for use in combination with ethylene or propylene.

In some embodiments, the monomer is ethylene and the one or more co-monomers may comprise an α-olefin having from 3 to 15 carbon atoms, or from 4 to 12 carbon atoms, or from 4 to 8 carbon atoms. In more specific embodiments, 1-hexene or 1-octene may be a suitable co-monomer.

In some embodiments, the monomer is propylene and the one or more co-monomers may comprise an α-olefin having from 3 to 15 carbon atoms, or from 4 to 12 carbon atoms, or from 4 to 8 carbon atoms. In more specific embodiments, 1-hexene or 1-octene may be a suitable co-monomer.

In some embodiments, the processes described herein produce polyolefins including homopolymers and copolymers of one, two, three, four or more $C_2$ to $C_{40}$ olefin monomers, for example, $C_2$ to $C_{20}$ α-olefin monomers.

For example, suitable polyolefins formed according to the disclosure herein may be copolymers of a $C_2$ to $C_{40}$ olefin and one, two or three or more different $C_2$ to $C_{40}$ olefins, where the $C_2$ to $C_{40}$ olefins are preferably $C_3$ to $C_{20}$ olefins, preferably are $C_3$ to $C_{12}$ α-olefins, and more preferably are propylene, butene, hexene, octene, decene, dodecene, preferably propylene, butene, hexene, octene, or a mixture thereof.

Such copolymers may comprise from 99.0 to about 80.0 wt. %, 99.0 to 85.0 wt. %, 99.0 to 87.5 wt. %, 99.0 to 90.0 wt. %, 99.0 to 92.5 wt. %, 99.0 to 95.0 wt. %, or 99.0 to 97.0 wt. %, of polymer units derived from the monomer (such as ethylene or propylene) and about 1.0 to about 20.0 wt. %, 1.0 to 15.0 wt. %, 0.5 to 12.5 wt. %, 1.0 to 10.0 wt. %, 1.0 to 7.5 wt. %, 1.0 to 5.0 wt. %, or 1.0 to 3.0 wt. % of polymer units derived from one or more $C_3$ to $C_{20}$ α-olefin co-monomers that are different from the monomer, preferably $C_3$ to $C_{10}$ α-olefins, and more preferably $C_4$ to $C_8$ α-olefins, such as 1-hexene and 1-octene. The α-olefin co-monomer may be linear or branched, and two or more co-monomers may be used, if desired.

Examples of suitable co-monomers include propylene, butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene. Particularly suitable co-monomers include 1-butene, 1-hexene, and 1-octene, 1-hexene, 1-octene, and mixtures thereof.

In the polymerization methods of the present disclosure, the polymerization reaction conditions may include a reaction temperature from about 30° C. to about 200° C., or from about 50° C. to about 150° C., or from about 80° C. to about 140° C., or from about 90° C. to about 130° C. Alternately, the polymerization reaction conditions may include temperatures ranging from about 30° C., or about 50° C., or about 100° C. up to the boiling point of the solvent used in solution polymerization under the conditions present in the reactor. In the specific case of ethylene polymerization, the polymerization reaction may take place at a temperature from about 80° C. to about 110° C. and a pressure of at least about 20 bar (2 MPa), or at least about 40 bar (4 MPa), or at least about 100 bar (100 MPa), or at least about 150 bar (15 MPa).

Polymers produced using the transition metal complexes and polymerization reactions of the present disclosure may be characterized by a range of physical property measurements, as discussed hereinafter.

In some embodiments, polyolefins produced using the catalyst systems of the present disclosure may have a density ranging from about 0.86 g/cc to about 0.97 g/cc, or about 0.90 g/cc to about 0.950 g/cc, or about 0.905 g/cc to about 0.940 g/cc, or about 0.910 g/cc to about 0.930 g/cc, as determined by ASTM D 1505.

In some embodiments, polyolefins produced using the catalyst systems of the present disclosure may have a ratio of weight average molecular weight to number average molecular weight (Mw/Mn) of about 1.5 to about 10, or about 2.0 to about 10, or about 2.2 to about 8, or about 2.4 to about 7, or about 2.5 to about 6, as determined by the Rapid GPC process disclosed further below.

In some embodiments, polyolefins produced using the catalyst systems of the present disclosure may have a ratio of z-average molecular weight to weight average molecular weight (Mz/Mw) of greater than 2.2, or greater than 2.5, or greater than 2.8, or from about 2.2 to about 4.0, or from about 2.4 to about 3.8, or from about 2.6 to about 3.6, as determined by the Rapid GPC process disclosed further below.

In some embodiments, polyolefins produced using the catalyst systems of the present disclosure may have a ratio of z-average molecular weight to number average molecular weight (Mz/Mn) of 10 or greater, or from about 10 to about 50, or from about 12 to about 45, or from about 15 to about 40, as determined by the Rapid GPC process disclosed further below.

In some embodiments, polyolefins produced using the catalyst systems of the present disclosure may have a weight average molecular weight (Mw) of 50,000 g/mol to 2,000,000 g/mol, alternately 8,000 g/mol to 30,000 g/mol, alternately 200,000 g/mol to 2,600,000 g/mol, as determined by the Rapid GPC process disclosed further below.

In some embodiments, polyolefins produced using the catalyst systems of the present disclosure may have a number average molecular weight (Mn) of 10,000 g/mol to 500,000 g/mol, alternately 1,000 g/mol to 20,000 g/mol, alternately 80,000 g/mol to 1,200,000 g/mol, as determined by the Rapid GPC process disclosed further below.

In some embodiments, polyolefins produced using the catalyst systems of the present disclosure may have a z average molecular weight (Mz) of 100,000 g/mol to 2,000,000 g/mol, alternately 18,000 g/mol to 80,000 g/mol, alternately 600,000 g/mol to 15,000,000 g/mol, as determined by the Rapid GPC process disclosed further below.

In some embodiments, polyolefins produced using the catalyst systems of the present disclosure may have a melting point (Tm) of from 100° C. to 200° C., alternately 45° C. to 135° C., alternately 80° C. to 130° C., and alternately 115° C. to 135° C., as determined by DSC described below.

Processing of the polymers may take place following the polymerization reaction. Suitable processing operations may include, for example, blending or co-extrusion with any other polymer. Non-limiting examples of other polymers include linear low density polyethylenes, elastomers, plastomers, high pressure low density polyethylene, high density polyethylenes, polypropylenes and the like. The polymers formed according to the present disclosure may also be blended with additives to form compositions that can then be used in articles of manufacture. Suitable additives may include antioxidants, nucleating agents, acid scavengers, plasticizers, stabilizers, anticorrosion agents, blowing agents, ultraviolet light absorbers, quenchers, antistatic agents, slip agents, phosphites, phenolics, pigments, dyes and fillers and cure agents such as peroxide.

This invention further relates to:

A. Benzazole and pseudoindole transition metal complexes. The transition metal complexes have a formula of:

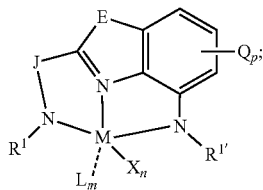

wherein: M is a transition metal; E is $NR^2$, $CR^3R^4$, O, S, or $SiR^5R^6$; Q is optional substitution selected from the group consisting of a hydrocarbyl group, a heteroatom substituent, and any combination thereof; p is an integer ranging from 0 to 3; L is an optional neutral ligand, with two L optionally being joined together to form a bidentate neutral ligand; m is an integer ranging from 0 to 3; X is an anionic leaving group, with two X optionally being joined together to form a dianionic leaving group; n is 1 or 2; wherein a sum of m+n is 4 or less; J is a linker group contributing two or three atoms that are located within a first chelate ring; $R^1$ and $R^{1'}$ are independently selected from the group consisting of a hydrocarbyl group and a trihydrocarbylsilyl group; $R^2$ is a hydrocarbyl group; $R^3$ and $R^4$ are independently selected from the group consisting of H, a hydrocarbyl group, and a trihydrocarbylsilyl group; and $R^5$ and $R^6$ are independently a hydrocarbyl group.

B. Catalyst systems. The catalyst systems comprise: at least one activator; and a transition metal complex having a formula of:

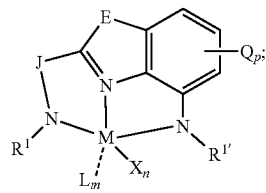

wherein: M is a transition metal; E is $NR^2$, $CR^3R^4$, O, S, or $SiR^5R^6$; Q is optional substitution selected from the group consisting of a hydrocarbyl group, a heteroatom substituent, and any combination thereof; p is an integer ranging from 0 to 3; L is an optional neutral ligand, with two L optionally being joined together to form a bidentate neutral ligand; m is an integer ranging from 0 to 3; X is an anionic leaving group, with two X optionally being joined together to form a dianionic leaving group; n is 1 or 2; wherein a sum of m+n is 4 or less; J is a linker group contributing two or three atoms that are located within a first chelate ring; $R^1$ and $R^{1'}$ are independently selected from the group consisting of a hydrocarbyl group and a trihydrocarbylsilyl group; $R^2$ is a hydrocarbyl group; $R^3$ and $R^4$ are independently selected from the group consisting of H, a hydrocarbyl group, and a trihydrocarbylsilyl group; and $R^5$ and $R^6$ are independently a hydrocarbyl group.

C. Polymerization methods. The methods comprise: providing an olefinic feed; and contacting the catalyst system of B with the olefinic feed under polymerization reaction conditions.

D. Benzimidazolyl transition metal complexes. The transition metal complexes have a structure selected from the group consisting of

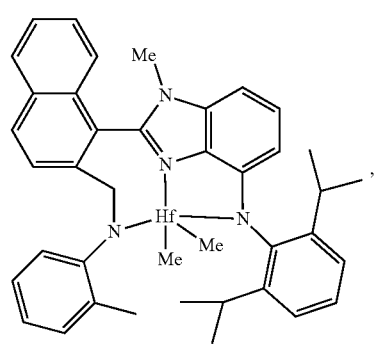

-continued

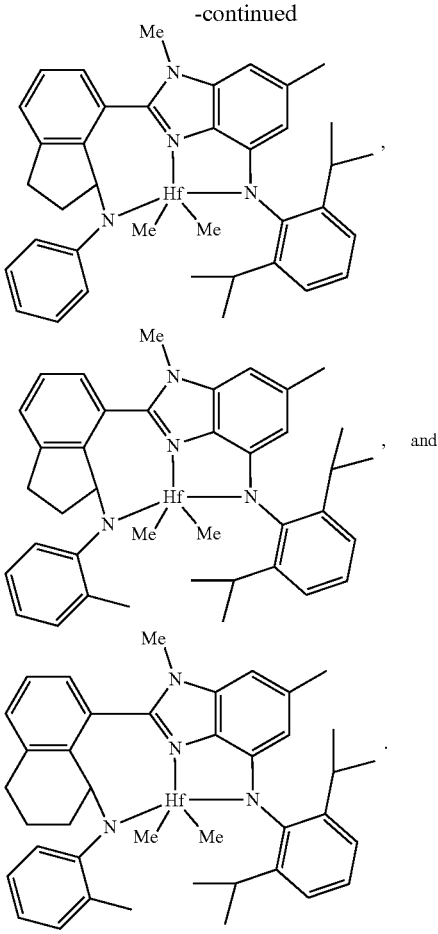

Embodiments A-C may have one or more of the following additional elements in any combination.

Element 1: wherein $R^1$ and $R^{1'}$ are independently selected from the group consisting of an alkyl group, an aryl group, and a trihydrocarbylsilyl group; $R^2$ is an alkyl group or an aryl group; $R^3$ and $R^4$ are independently selected from the group consisting of H, an alkyl group, an aryl group, and a trihydrocarbylsilyl group; and $R^5$ and $R^6$ are independently selected from the group consisting of an alkyl group and an aryl group.

Element 2: wherein M is a group 4 transition metal.

Element 3: wherein M is Hf.

Element 4: wherein $R^1$ and $R^{1'}$ are each an aryl group.

Element 5: wherein J contributes three atoms that are located within the first chelate ring.

Element 6: wherein J is selected from the group consisting of

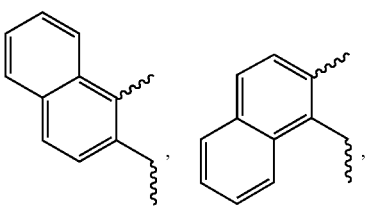

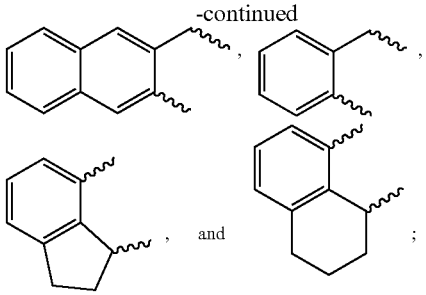

wherein each wavy bond indicates a point of connectivity within the first chelate ring.

Element 7: wherein E is $NR^2$.

Element 8: wherein $R^2$ is an alkyl group.

Element 9: wherein each X is methyl.

Element 10: wherein the at least one activator comprises an alumoxane or a non-coordinating anion.

Element 11: wherein the non-coordinating anion comprises a borate anion.

By way of non-limiting example, exemplary combinations include: The transition metal complex of A, the catalyst system of B or the method of C in combination with elements 1 and 2; 1 and 3; 1 and 5; 1 and 6; 1 and 7; 1 and 8; 1 and 9; 2 and 4; 2 and 5; 2 and 6; 2 and 7; 2 and 8; 2 and 9; 5 or 6 and 7; 5 or 6 and 8; 5 or 6 and 9; 7 and 8; 7 and 9; and 8 and 9. The catalyst system of B or the method of C in combination with elements 1 and 10 or 11; 2 and 10 or 11; 3 and 10 or 11; 4 and 10 or 11; 5 and 10 or 11; 6 and 10 or 11; 7 and 10 or 11; 8 and 10 or 11; 9 and 10 or 11; 1, 2, and 10 or 11; 1, 3, and 10 or 11; 1, 5, and 10 or 11; 1, 6, and 10 or 11; 1, 7, and 10 or 11; 1, 8, and 10 or 11; 1, 9, and 10 or 11; 2, 4, and 10 or 11; 2, 5, and 10 or 11; 2, 6, and 10 or 11; 2, 7, and 10 or 11; 2, 8, and 10 or 11; 2, 9, and 10 or 11; 5 or 6, 7, and 10 or 11; 5 or 6, 8, and 10 or 11; 5 or 6, 9, and 10 or 11; 7, 8, and 10 or 11; 7, 9, and 10 or 11; and 8, 9, and 10 or 11.

This invention further relates to:

1. Transition metal complexes represented by the formula:

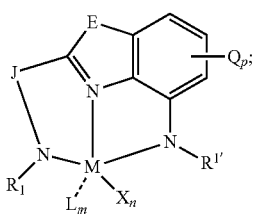

wherein: M is a transition metal; E is $NR^2$, $CR^3R^4$, O, S, or $SiR^5R^6$; Q is optional substitution selected from the group consisting of a hydrocarbyl group, a heteroatom substituent, and any combination thereof; p is an integer ranging from 0 to 3; L is an optional neutral ligand, with two L optionally being joined together to form a bidentate neutral ligand; m is an integer ranging from 0 to 3; X is an anionic leaving group, with two X optionally being joined together to form a dianionic leaving group; n is 1 or 2; wherein a sum of m+n is 4 or less; J is a linker group contributing two or three atoms that are located within a first chelate ring; $R^1$ and $R^{1'}$ are independently selected from the group consisting of a hydrocarbyl group and a trihydrocarbylsilyl group; $R^2$ is a hydrocarbyl group; $R^3$ and $R^4$ are independently selected from the group consisting of H, a hydrocarbyl group, and a trihydrocarbylsilyl group; and R⁵ and R⁶ are independently a hydrocarbyl group.

2. The transition metal complex of paragraph 1, wherein: $R^1$ and $R^{1'}$ are independently selected from the group consisting of an alkyl group, an aryl group, and a trihydrocarbylsilyl group; $R^2$ is an alkyl group or an aryl group; $R^3$ and $R^4$ are independently selected from the group consisting of H, an alkyl group, an aryl group, and a trihydrocarbylsilyl group; and $R^5$ and $R^6$ are independently selected from the group consisting of an alkyl group and an aryl group.

3. The transition metal complex of paragraph 1 or paragraph 2, wherein M is a group 4 transition metal.

4. The transition metal complex of any one of paragraphs 1-3, wherein M is Hf.

5. The transition metal complex of any one of paragraphs 1-4, wherein $R^1$ and $R^{1'}$ are each an aryl group.

6. The transition metal complex of any one of paragraphs 1-5, wherein J contributes three atoms that are located within the first chelate ring.

7. The transition metal complex of any one of paragraphs 1-6, wherein J is selected from the group consisting of

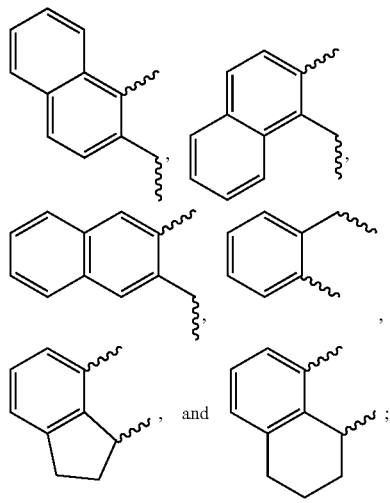

wherein each wavy bond indicates a point of connectivity within the first chelate ring.

8. The transition metal complex of any one of paragraphs 1-7, wherein E is $NR^2$.

9. The transition metal complex of paragraph 8, wherein $R^2$ is an alkyl group.

10. The transition metal complex of any one of paragraphs 1-9, wherein each X is methyl.

11. Catalyst systems comprising: at least one activator; and a transition metal complex having a formula of:

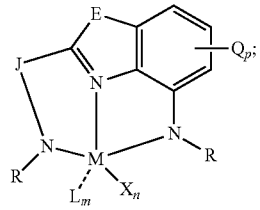

wherein: M is a transition metal; E is $NR^2$, $CR^3R^4$, O, S, or $SiR^5R^6$; Q is optional substitution selected from the group consisting of a hydrocarbyl group, a heteroatom substituent, and any combination thereof; p is an integer ranging from 0 to 3; L is an optional neutral ligand, with two L optionally being joined together to form a bidentate neutral ligand; m is an integer ranging from 0 to 3; X is an anionic leaving group, with two X optionally being joined together to form a dianionic leaving group; n is 1 or 2; wherein a sum of m+n is 4 or less; J is a linker group contributing two or three atoms that are located within a first chelate ring; $R^1$ and $R^{1'}$ are independently selected from the group consisting of a hydrocarbyl group and a trihydrocarbylsilyl group; $R^2$ is a hydrocarbyl group; $R^3$ and $R^4$ are independently selected from the group consisting of H, a hydrocarbyl group, and a trihydrocarbylsilyl group; and $R^5$ and $R^6$ are independently a hydrocarbyl group.

12. The catalyst system of paragraph 11, wherein: $R^1$ and $R^{1'}$ are independently selected from the group consisting of an alkyl group, an aryl group, and a trihydrocarbylsilyl group; $R^2$ is an alkyl group or an aryl group; $R^3$ and $R^4$ are independently selected from the group consisting of H, an alkyl group, an aryl group, and a trihydrocarbylsilyl group; and $R^5$ and $R^6$ are independently selected from the group consisting of an alkyl group and an aryl group.

13. The catalyst system of paragraph 11 or paragraph 12, wherein the at least one activator comprises an alumoxane or a non-coordinating anion.

14. The catalyst system of paragraph 13, wherein the non-coordinating anion comprises a borate anion.

15. The catalyst system of any one of paragraphs 11-14, wherein M is a group 4 transition metal.

16. The catalyst system of any one of paragraphs 11-15, wherein M is Hf.

17. The catalyst system of any one of paragraphs 11-16, wherein $R^1$ and $R^{1'}$ are each an aryl group.

18. The catalyst system of any one of paragraphs 11-17, wherein J contributes three atoms that are located within the first chelate ring.

19. The catalyst system of paragraph 18, wherein J is selected from the group consisting of

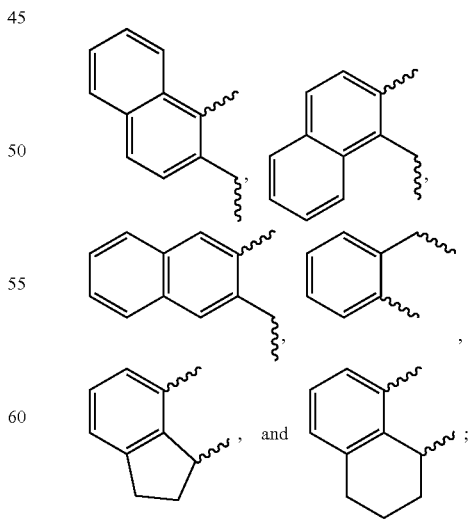

wherein each wavy bond indicates a point of connectivity to the first chelate ring.

20. The catalyst system of any one of paragraphs 11-19, wherein E is NR².

21. The catalyst system of paragraph 20, wherein R² is an alkyl group.

22. The catalyst system of any one of paragraphs 11-21, wherein each X is methyl.

23. Polymerization methods comprising: providing an olefinic feed; and contacting the catalyst system of paragraph 11 with the olefinic feed under polymerization reaction conditions.

24. The method of paragraph 23, wherein the at least one activator comprises an alumoxane or a non-coordinating anion.

25. The method of paragraph 24, wherein the non-coordinating anion comprises a borate anion.

26. The method of any one of paragraphs 23-25, wherein: $R^1$ and $R^{1'}$ are independently selected from the group consisting of an alkyl group, an aryl group, and a trihydrocarbylsilyl group; $R^2$ is an alkyl group or an aryl group; $R^3$ and $R^4$ are independently selected from the group consisting of H, an alkyl group, an aryl group, and a trihydrocarbylsilyl group; and $R^5$ and $R^6$ are independently selected from the group consisting of an alkyl group and an aryl group.

27. The method of any one of paragraphs 23-26, wherein M is a group 4 transition metal.

28. The method of any one of paragraphs 23-27, wherein M is Hf.

29. The method of any one of paragraphs 23-28, wherein each R is an aryl group.

30. The method of any one of paragraphs 23-29, wherein J contributes three atoms that are located within the first chelate ring.

31. The method of paragraph 30, wherein J is selected from the group consisting of

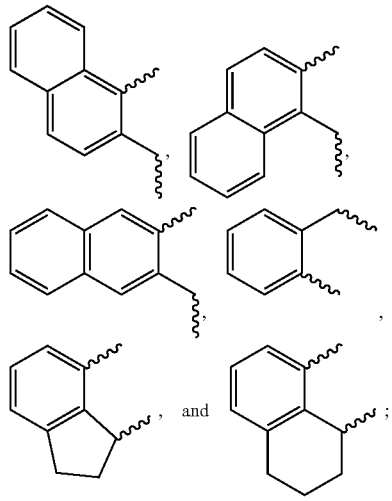

wherein each wavy bond indicates a point of connectivity to the first chelate ring.

32. The method of any one of paragraphs 23-31, wherein E is NR².

33. The method of paragraph 32, wherein R² is an alkyl group.

34. The method of any one of paragraphs 23-33, wherein each X is methyl.

This invention also relates to:

1A. Transition metal complexes represented by the formula:

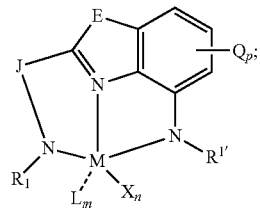

wherein: M is a transition metal; E is NR², CR³R⁴, O, S, or SiR⁵R⁶; Q is optional substitution selected from the group consisting of a hydrocarbyl group, a heteroatom substituent, and any combination thereof; p is an integer ranging from 0 to 3; L is an optional neutral ligand, with two L optionally being joined together to form a bidentate neutral ligand; m is an integer ranging from 0 to 3; X is an anionic leaving group, with two X optionally being joined together to form a dianionic leaving group; n is 1 or 2; wherein a sum of m+n is 4 or less; J is a linker group contributing two or three atoms that are located within a first chelate ring; $R^1$ and $R^{1'}$ are independently selected from the group consisting of a hydrocarbyl group and a trihydrocarbylsilyl group; $R^2$ is a hydrocarbyl group; $R^3$ and $R^4$ are independently selected from the group consisting of H, a hydrocarbyl group, and a trihydrocarbylsilyl group; and $R^5$ and $R^6$ are independently a hydrocarbyl group.

2A. The transition metal complex of paragraph 1A, wherein: $R^1$ and $R^{1'}$ are independently selected from the group consisting of an alkyl group, an aryl group, and a trihydrocarbylsilyl group; $R^2$ is an alkyl group or an aryl group; $R^3$ and $R^4$ are independently selected from the group consisting of H, an alkyl group, an aryl group, and a trihydrocarbylsilyl group; and $R^5$ and $R^6$ are independently selected from the group consisting of an alkyl group and an aryl group.

3A. The transition metal complex of paragraph 1A or paragraph 2A, wherein M is a group 4 transition metal.

4A. The transition metal complex of paragraph 1A or 2A, wherein M is Hf.

5A. The transition metal complex of paragraph 3A, wherein $R^1$ and $R^{1'}$ are each an aryl group.

6A. The transition metal complex of paragraph 3A, wherein J contributes three atoms that are located within the first chelate ring.

7A. The transition metal complex of paragraph 3A, wherein J is selected from the group consisting of

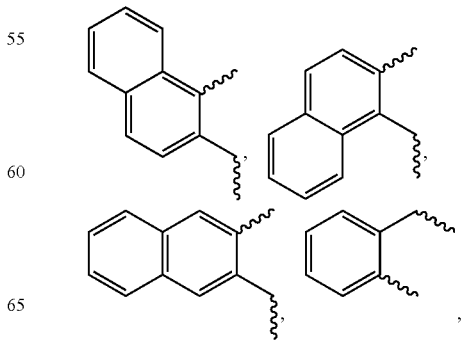

-continued

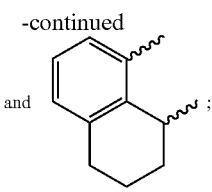

wherein each wavy bond indicates a point of connectivity within the first chelate ring.

8A. The transition metal complex of paragraph 3A, wherein E is $NR^2$.

9A. The transition metal complex of paragraph 8A, wherein $R^2$ is an alkyl group.

10A. The transition metal complex of paragraph 3A, wherein each X is methyl.

11A. Catalyst systems comprising: at least one activator; and a transition metal complex having a formula of:

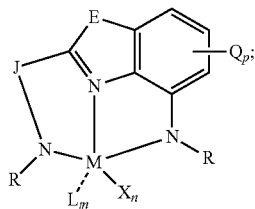

wherein: M is a transition metal; E is $NR^2$, $CR^3R^4$, O, S, or $SiR^5R^6$; Q is optional substitution selected from the group consisting of a hydrocarbyl group, a heteroatom substituent, and any combination thereof; p is an integer ranging from 0 to 3; L is an optional neutral ligand, with two L optionally being joined together to form a bidentate neutral ligand; m is an integer ranging from 0 to 3; X is an anionic leaving group, with two X optionally being joined together to form a dianionic leaving group; n is 1 or 2; wherein a sum of m+n is 4 or less; J is a linker group contributing two or three atoms that are located within a first chelate ring; $R^1$ and $R^{1'}$ are independently selected from the group consisting of a hydrocarbyl group and a trihydrocarbylsilyl group; $R^2$ is a hydrocarbyl group; $R^3$ and $R^4$ are independently selected from the group consisting of H, a hydrocarbyl group, and a trihydrocarbylsilyl group; and $R^5$ and $R^6$ are independently a hydrocarbyl group.

12A. The catalyst system of paragraph 11A, wherein: $R^1$ and $R^{1'}$ are independently selected from the group consisting of an alkyl group, an aryl group, and a trihydrocarbylsilyl group; $R^2$ is an alkyl group or an aryl group; $R^3$ and $R^4$ are independently selected from the group consisting of H, an alkyl group, an aryl group, and a trihydrocarbylsilyl group; and $R^5$ and $R^6$ are independently selected from the group consisting of an alkyl group and an aryl group.

13A. The catalyst system of paragraph 11A or paragraph 12A, wherein the at least one activator comprises an alumoxane or a non-coordinating anion.

14A. The catalyst system of paragraph 13A, wherein the non-coordinating anion comprises a borate anion.

15A. The catalyst system of paragraph 13A, wherein M is a group 4 transition metal.

16A. The catalyst system of paragraph 13A, wherein M is Hf.

17A. The catalyst system of paragraph 15A, wherein $R^1$ and $R^{1'}$ are each an aryl group.

18A. The catalyst system of paragraph 15A, wherein J contributes three atoms that are located within the first chelate ring.

19A. The catalyst system of paragraph 15A, wherein J is selected from the group consisting of

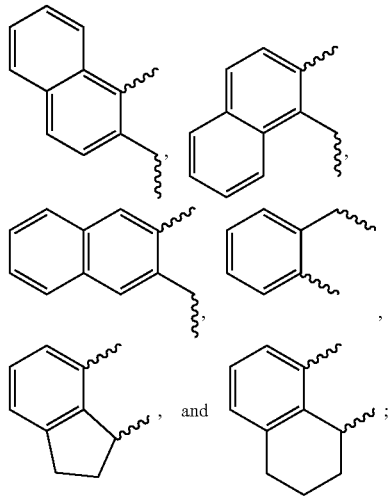

wherein each wavy bond indicates a point of connectivity to the first chelate ring.

20A. The catalyst system of paragraph 15A, wherein E is $NR^2$.

21A. The catalyst system of paragraph 20A, wherein $R^2$ is an alkyl group.

22A. The catalyst system of paragraph 15A, wherein each X is methyl.

23A. Polymerization methods comprising: providing an olefinic feed; and contacting the catalyst system of paragraph 11A with the olefinic feed under polymerization reaction conditions.

24A. The method of paragraph 23A, wherein the at least one activator comprises an alumoxane or a non-coordinating anion.

25A. The method of paragraph 24A, wherein the non-coordinating anion comprises a borate anion.

26A. The method of any one of paragraphs 23A, 24A or 25A, wherein: $R^1$ and $R^{1'}$ are independently selected from the group consisting of an alkyl group, an aryl group, and a trihydrocarbylsilyl group; $R^2$ is an alkyl group or an aryl group; $R^3$ and $R^4$ are independently selected from the group consisting of H, an alkyl group, an aryl group, and a trihydrocarbylsilyl group; and $R^5$ and $R^6$ are independently selected from the group consisting of an alkyl group and an aryl group.

27A. The method of any one of paragraphs 23A, 24A or 25A, wherein M is a group 4 transition metal.

28A. The method of any one of paragraphs 23A, 24A or 25A, wherein M is Hf.

29A. The method of paragraph 27A, wherein each R is an aryl group.

30A. The method of paragraph 27A, wherein J contributes three atoms that are located within the first chelate ring.

31A. The method of paragraph 27A, wherein J is selected from the group consisting of

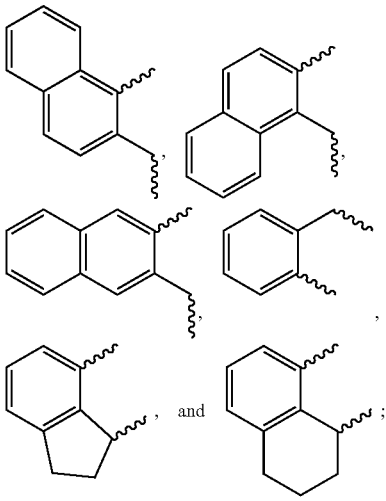

wherein each wavy bond indicates a point of connectivity to the first chelate ring.

32A. The method of paragraph 27A, wherein E is $NR^2$.

33A. The method of paragraph 32A, wherein $R^2$ is an alkyl group.

34A. The method of paragraph 27A, wherein each X is methyl.

This invention also relates to:

1B. Transition metal complexes represented by the formula:

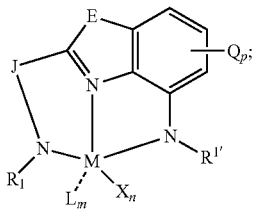

wherein: M is a transition metal; E is $NR^2$, $CR^3R^4$, O, S, or $SiR^5R^6$; Q is optional substitution selected from the group consisting of a hydrocarbyl group, a heteroatom substituent, and any combination thereof; p is an integer ranging from 0 to 3; L is an optional neutral ligand, with two L optionally being joined together to form a bidentate neutral ligand; m is an integer ranging from 0 to 3; X is an anionic leaving group, with two X optionally being joined together to form a dianionic leaving group; n is 1 or 2; wherein a sum of m+n is 4 or less; J is a linker group contributing two or three atoms that are located within a first chelate ring; $R^1$ and $R^{1'}$ are independently selected from the group consisting of a hydrocarbyl group and a trihydrocarbylsilyl group; $R^2$ is a hydrocarbyl group; $R^3$ and $R^4$ are independently selected from the group consisting of H, a hydrocarbyl group, and a trihydrocarbylsilyl group; and $R^5$ and $R^6$ are independently a hydrocarbyl group.

2B. The transition metal complex of paragraph 1B, wherein: $R^1$ and $R^{1'}$ are independently selected from the group consisting of an alkyl group, an aryl group, and a trihydrocarbylsilyl group; $R^2$ is an alkyl group or an aryl group; $R^3$ and $R^4$ are independently selected from the group consisting of H, an alkyl group, an aryl group, and a trihydrocarbylsilyl group; and $R^5$ and $R^6$ are independently selected from the group consisting of an alkyl group and an aryl group.

3B. The transition metal complex of paragraph 1B, wherein M is a group 4 transition metal.

4B. The transition metal complex of paragraph 3B, wherein M is Hf.

5B. The transition metal complex of paragraph 3B, wherein $R^1$ and $R^{1'}$ are each an aryl group.

6B. The transition metal complex of paragraph 3B, wherein J contributes three atoms that are located within the first chelate ring.

7B. The transition metal complex of paragraph 3B, wherein J is selected from the group consisting of

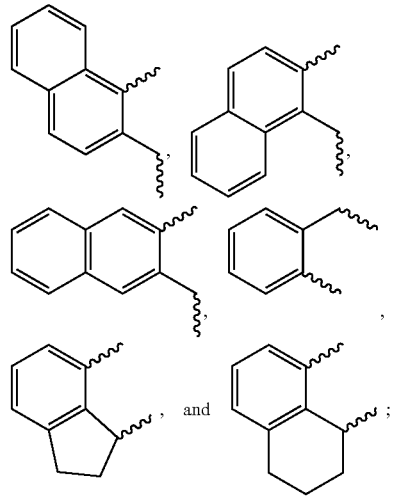

wherein each wavy bond indicates a point of connectivity within the first chelate ring.

8B. The transition metal complex of paragraph 3B, wherein E is $NR^2$.

9B. The transition metal complex of paragraph 8B, wherein $R^2$ is an alkyl group.

10B. The transition metal complex of paragraph 3B, wherein each X is methyl.

11B. Catalyst systems comprising: at least one activator; and a transition metal complex having a formula of:

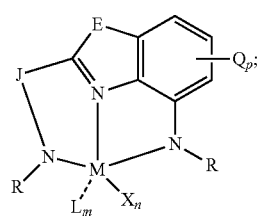

wherein: M is a transition metal; E is $NR^2$, $CR^3R^4$, O, S, or $SiR^5R^6$; Q is optional substitution selected from the group consisting of a hydrocarbyl group, a heteroatom substituent, and any combination thereof; p is an integer ranging from 0 to 3; L is an optional neutral ligand, with two L optionally being joined together to form a bidentate neutral ligand; m is an integer ranging from 0 to 3; X is an anionic leaving group, with two X optionally being joined together to form a dianionic leaving group; n is 1 or 2; wherein a sum of m+n is 4 or less; J is a linker group contributing two or three atoms that are located within a first chelate ring; $R^1$ and $R^{1'}$ are independently selected from the group consisting of a hydrocarbyl group and a trihydrocarbylsilyl group; $R^2$ is a hydrocarbyl group; $R^3$ and $R^4$ are independently selected from the group consisting of H, a hydrocarbyl group, and a trihydrocarbylsilyl group; and $R^5$ and $R^6$ are independently a hydrocarbyl group.

12B. The catalyst system of paragraph 11B, wherein: $R^1$ and $R^{1'}$ are independently selected from the group consisting of an alkyl group, an aryl group, and a trihydrocarbylsilyl group; $R^2$ is an alkyl group or an aryl group; $R^3$ and $R^4$ are independently selected from the group consisting of H, an alkyl group, an aryl group, and a trihydrocarbylsilyl group; and $R^5$ and $R^6$ are independently selected from the group consisting of an alkyl group and an aryl group.

13B. The catalyst system of paragraph 11B, wherein the at least one activator comprises an alumoxane or a non-coordinating anion.

14B. The catalyst system of paragraph 13B, wherein the non-coordinating anion comprises a borate anion.

15B. The catalyst system of paragraph 13B, wherein M is a group 4 transition metal.

16B. The catalyst system of paragraph 15B, wherein M is Hf.

17B. The catalyst system of paragraph 15B, wherein $R^1$ and $R^{1'}$ are each an aryl group.

18B. The catalyst system of paragraph 15B, wherein J contributes three atoms that are located within the first chelate ring.

19B. The catalyst system of paragraph 15B, wherein J is selected from the group consisting of

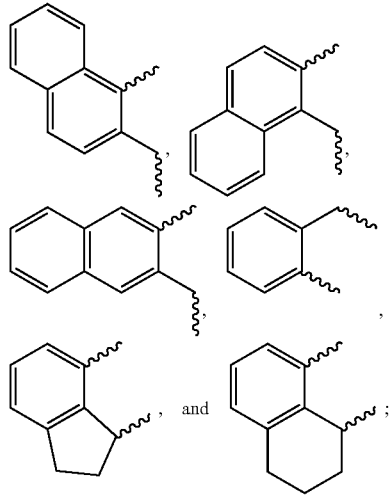

wherein each wavy bond indicates a point of connectivity to the first chelate ring.

20B. The catalyst system of paragraph 15B, wherein E is $NR^2$.

21B. The catalyst system of paragraph 20B, wherein $R^2$ is an alkyl group.

22B. The catalyst system of paragraph 15B, wherein each X is methyl.

23B. Polymerization methods comprising: providing an olefinic feed; and contacting the catalyst system of paragraph 11B with the olefinic feed under polymerization reaction conditions.

24B. The method of paragraph 23B, wherein the at least one activator comprises an alumoxane or a non-coordinating anion.

25B. The method of paragraph 24B, wherein the non-coordinating anion comprises a borate anion.

26B. The method of paragraph 24B, wherein: $R^1$ and $R^{1'}$ are independently selected from the group consisting of an alkyl group, an aryl group, and a trihydrocarbylsilyl group; $R^2$ is an alkyl group or an aryl group; $R^3$ and $R^4$ are independently selected from the group consisting of H, an alkyl group, an aryl group, and a trihydrocarbylsilyl group; and $R^5$ and $R^6$ are independently selected from the group consisting of an alkyl group and an aryl group.

27B. The method of paragraph 24B, wherein M is a group 4 transition metal.

28B. The method of paragraph 27B, wherein M is Hf.

29B. The method of paragraph 27B, wherein each R is an aryl group.

30B. The method of paragraph 27B, wherein J contributes three atoms that are located within the first chelate ring.

31B. The method of paragraph 27B, wherein J is selected from the group consisting of

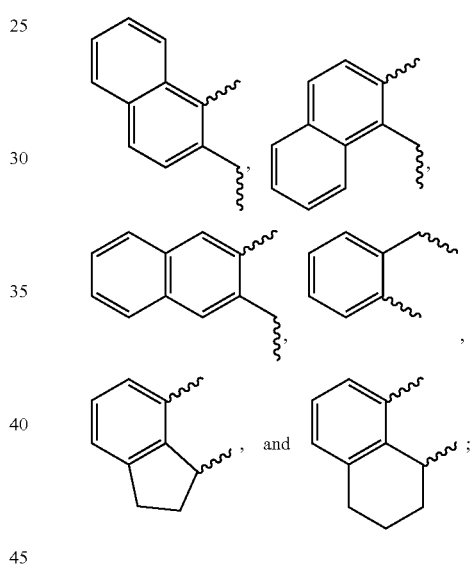

wherein each wavy bond indicates a point of connectivity to the first chelate ring.

32B. The method of paragraph 27B, wherein E is $NR^2$.

33B. The method of paragraph 32B, wherein $R^2$ is an alkyl group.

34B. The method of paragraph 27B, wherein each X is methyl.

To facilitate a better understanding of the embodiments described herein, the following examples of various representative embodiments are given. In no way should the following examples be read to limit, or to define, the scope of the present disclosure.

EXAMPLES

The following transition metal complexes were synthesized for use in polymerization reactions described in further detail below. Representative syntheses follow hereinafter.

Complex I

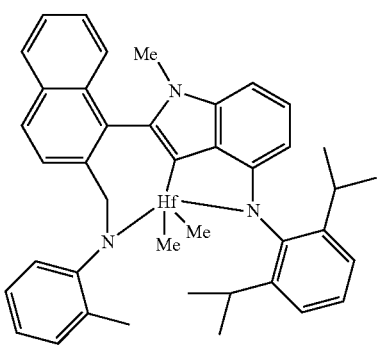

Complex II

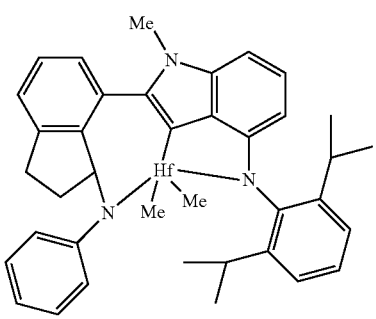

Complex III

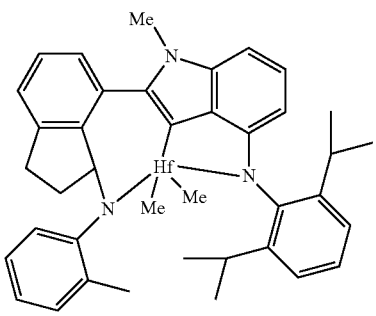

Complex IV

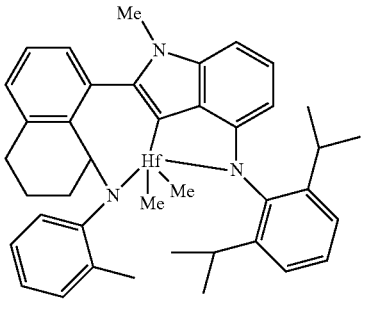

Syntheses

N-(2,6-Dibromo-4-methylphenyl)-N'-methylurea (Formula 39)

To a solution of 92.0 g (347 mmol) of 2,6-dibromo-4-methylaniline in 2,000 mL of dry o-xylene was added 123 g (296 mmol) of triphosgene in small portions at room temperature. Afterward, the reaction mixture was gently warmed to 110° C. and stirred for 40 minutes at this temperature (Caution: phosgene evolution). The resulting mixture was then heated to reflux for 8 hours and then evaporated to dryness. The residue was diluted with 400 mL of dichloromethane followed by an addition of 300 mL of 40% methylamine. The resulting suspension was stirred for 30 minutes, and then the resulting product was filtered off on a glass frit (G3), and the precipitate was washed with methanol (300 mL). The precipitate obtained was dried under reduced pressure. Yield 88.2 g (79%) of a colorless solid. $^1$H NMR (DMSO-d6): δ 7.87 (br.s, 1H), 7.49 (s, 2H), 6.08 (br.s, 1H), 2.59 (d, J=4.1 Hz, 3H), 2.27 (s, 3H).

Formula 39

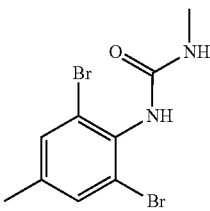

N-(2,6-Dibromo-4-methylphenyl)-N-(4-methoxybenzyl)-N'-methylurea (Formula 40)

To a suspension of 88.0 g (273 mmol) of N-(2,6-dibromo-4-methylphenyl)-N'-methylurea in 1,000 mL of dry toluene was added 111 mL (279 mmol, 2.5 M) of n-butyllithium in hexanes dropwise at −25° C. The reaction mixture was stirred for 3 hours at room temperature and then was evaporated to dryness. The residue was diluted with 1,000 mL of dry THF followed by an addition of 55.4 g (347 mmol) of 4-methoxybenzyl chloride and 50 mL of HMPA. The obtained mixture was stirred for 18 hours at 60° C., then cooled to room temperature and poured into 2,000 mL of water. The crude product was extracted with toluene (3×300 mL). The combined organic extract was dried over Na$_2$SO$_4$ and passed through a pad of silica gel 60 (40-63 μm, 100 mL). The obtained solution was evaporated to dryness. The residue was washed with 120 mL of diethyl ether, and the resulting crystalline material was dried under reduced pressure. Yield 78.0 g (64%) of a colorless crystalline solid. $^1$H NMR (CDCl$_3$): δ 7.36 (s, 2H), 7.14-7.17 (m, 2H), 6.69-6.73 (m, 2H), 4.75 (s, 2H), 3.93 (br.s, 1H), 3.74 (s, 3H), 2.75 (d, J=4.68 Hz, 3H), 2.29 (s, 3H).

Formula 40

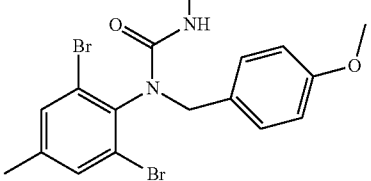

4-Bromo-3-(4-methoxybenzyl)-1,6-dimethyl-1,3-dihydro-2H-benzimidazol-2-one (Formula 41)

To a solution of 78.0 g (176 mmol) of N-(2,6-dibromo-4-methylphenyl)-N-(4-methoxybenzyl)-N'-methylurea in 1200 mL of freshly distilled DMSO was added 19.8 g (352 mmol) of KOH at room temperature. The reaction mixture was stirred for 48 hours at 40° C. and then poured into a 2,000 mL of water. The crude product was extracted with diethyl ether (3×400 mL). The combined organic extract was dried over Na$_2$SO$_4$ and then passed through a pad of silica gel 60 (40-63 m, 100 mL). The obtained eluent was then evaporated to dryness. The residue was washed with 120 mL of diethyl ether, and the resulting crystalline material was dried under reduced pressure. Yield 43.4 g (69%) of a colorless crystals. $^1$H NMR (CDCl$_3$): δ 7.19-7.23 (m, 2H), 6.99 (m, 1H), 6.79-6.82 (m, 2H), 6.72 (m, 1H), 5.39 (s, 2H), 3.75 (s, 3H), 3.40 (s, 3H), 2.34 (s, 3H).

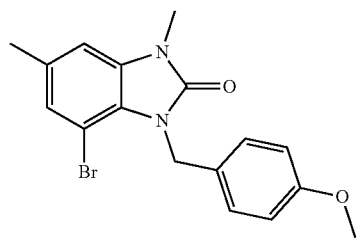

Formula 41

4-[(2,6-Diisopropylphenyl)amino]-1,6-dimethyl-1,3-dihydro-2H-benzimidazol-2-one (Formula 42)

To a solution of 22.0 mL (124 mmol) of 2,6-diisopropylaniline in 900 mL of dry toluene was added 45.5 mL (147 mmol, 2.5 M) of n-butyllithium in hexanes at room temperature. The resulting suspension was heated to 100° C. and then cooled to room temperature. To the reaction mixture were added 1.78 g (3.10 mmol) of Pd(dba)$_2$, 2.96 g (6.20 mmol) of XPhos and 37.3 g (103 mmol) of 4-bromo-3-(4-methoxybenzyl)-1,6-dimethyl-1,3-dihydro-2H-benzimidazol-2-one. The resulting dark brown suspension was heated for 48 hours at 100° C. and then poured into 500 mL of water. The organic layer was separated, dried over Na$_2$SO$_4$ and then evaporated to dryness. The obtained oil was dissolved in a mixture of 340 mL of dichloromethane, 250 mL of trifluoroacetic acid and 75 mL of triflic acid. The resulting solution was stirred for 48 hours at room temperature and then gently poured into a solution of 700 g of K$_2$CO$_3$ and 2,000 mL of water. The organic layer was separated, and the aqueous phase was additionally extracted with 3×400 mL of dichloromethane. The combined organic extract was dried over Na$_2$SO$_4$ and then evaporated to dryness. The resulting solid was triturated with 100 mL of diethyl ether, and the resulting suspension was collected on a glass frit (G3). The precipitate was dried under reduced pressure. Yield 24.6 g (71%) of a white solid. $^1$H NMR (CDCl$_3$): δ 7.28-7.32 (m, 1H), δ 7.21-7.23 (m, 2H), 6.66 (br.s, 1H), 6.05 (s, 1H), 5.73 (s, 1H), 3.43 (br.s, 2H), 2.54 (br.s, 3H), 2.20 (s, 3H), 1.13 (br.s, 12H).

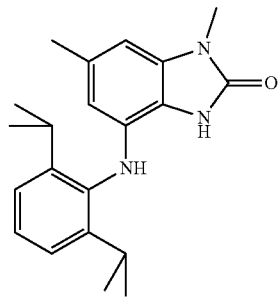

Formula 42

2-Chloro-N-(2,6-diisopropylphenyl)-1,6-dimethyl-1H-benzimidazol-4-amine (Formula 43)

24.6 g (73.0 mmol) of 4-[(2,6-diisopropylphenyl)amino]-1,6-dimethyl-1,3-dihydro-2H-benzimidazol-2-one was added to 400 mL of phosphorus oxychloride in one portion. The resulting suspension was heated for 40 hours at 105° C. and then evaporated to dryness. The resulting oil was triturated with 200 mL of diethyl ether. The resulting solution was washed with 200 mL of water, dried over Na$_2$SO$_4$ and then evaporated to dryness. The formed solid was triturated with 30 mL of cold n-hexane, and the suspension thus obtained was filtered through a glass frit (G3). The resulting precipitate was then dried under reduced pressure. Yield 18.9 g (73%) of a yellow-green solid. $^1$H NMR (CDCl$_3$): δ 7.31-7.35 (m, 1H), δ 7.23-7.25 (m, 2H), 6.43 (m, 1H), 6.10 (br.s, 1H), 5.76 (m, 1H), 3.71 (s, 3H), 3.32 (sept, J=6.94 Hz, 2H), 2.26 (s, 3H), 1.13 (d, J=6.94 Hz, 12H).

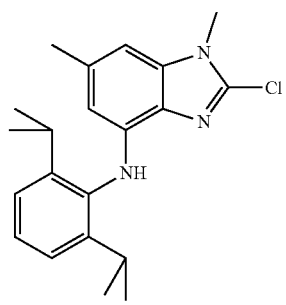

Formula 43

N-(2,6-Diisopropylphenyl)-1,6-dimethyl-2-(2-{[(2-methylphenyl)amino]methyl}-1-naphthyl)-1H-benzimidazol-4-amine (Formula 44)

To a solution of 1.50 g (4.21 mmol) of 2-chloro-N-(2,6-diisopropylphenyl)-1,6-dimethyl-1H-benzimidazol-4-amine in 16 mL of dioxane were added 1.89 g (5.06 mmol) of 2-methyl-N-{[1-(4,4,5,5-tetramethyl-1,3,2-dioxaborolan-2-yl)-2-naphthyl]methyl}aniline, 3.43 g (10.53 mmol) of cesium carbonate and 10 mL of water. The resulting mixture was sparged with argon for 30 minutes, followed by addition of 240 mg (0.211 mmol) of Pd(PPh$_3$)$_4$. This mixture was stirred for 12 hours at 95° C. and then cooled to room temperature. To the obtained two-phase mixture was added 100 mL of n-hexane. The n-hexane layer was separated and washed with brine. The resulting solution was dried over Na$_2$SO$_4$ and then was evaporated to dryness. The residue was purified by flash chromatography on silica gel 60 (40-63 m, eluent: hexane-ethyl acetate-triethylamine=100:10:1, vol.) and then recrystallized from 25 mL of n-hexane. Yield 1.18 g (49%) of a white powder. ¹H NMR (CDCl₃): (8.04 (d, J=8.43 Hz, 1H), 7.95 (d, J=7.98 Hz, 1H), 7.54 (t, J=7.10 Hz, 1H), 7.48 (t, J=7.10 Hz, 1H), 7.34-7.40 (m, 2H), 7.27-7.31 (m, 2H), 6.99-7.05 (m, 2H), 6.57-6.65 (m, 3H), 6.32 (s, 1H), 5.90 (s, 1H), 4.62 (dd, J₁=14.53 Hz, J₂=7.21 Hz, 1H), 4.38 (dd, J₁=14.47 Hz, J₂=3.60 Hz, 1H), 4.14 (br.s, 1H), 3.35 (br.s, 2H), 3.33 (s, 3H), 2.38 (s, 3H), 2.00 (s, 3H), 1.13-1.24 (m, 12H).

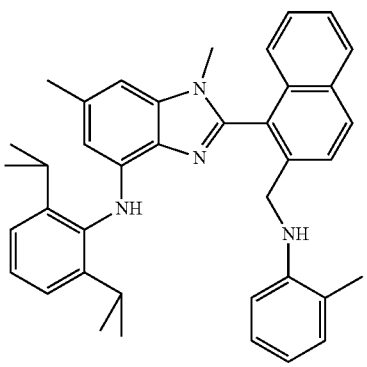

Formula 44

2-(3-Anilino-2,3-dihydro-1H-inden-4-yl)-N-(2,6-diisopropylphenyl)-1,6-dimethyl-1H-benzimidazol-4-amine (Formula 45)

To a solution of 1.50 g (4.21 mmol) of 2-chloro-N-(2,6-diisopropylphenyl)-1,6-dimethyl-1H-benzimidazol-4-amine in 16 mL of dioxane were added 1.69 g (5.06 mmol) of phenyl[7-(4,4,5,5-tetramethyl-1,3,2-dioxaborolan-2-yl)-2,3-dihydro-1H-inden-1-yl]amine, 3.43 g (10.53 mmol) of cesium carbonate and 10 mL of water. The obtained mixture was sparged with argon for 30 minutes, followed by addition of 240 mg (0.211 mmol) of Pd(PPh₃)₄. This mixture was stirred for 12 hours at 95° C. and then cooled to room temperature. To the resulting two-phase mixture was added 100 mL of n-hexane. The n-hexane layer was separated and washed with brine. The resulting solution was dried over Na₂SO₄ and then evaporated to dryness. The residue was purified by flash chromatography on silica gel 60 (40-63 μm, eluent: hexane-ethyl acetate-triethylamine=100:10:1, vol.). Yield 1.76 g (79%) of a colorless oil. ¹H NMR (CDCl₃): δ 7.39-7.44 (m, 2H), 7.30-7.35 (m, 2H), 7.22-7.26 (m, 2H), 6.92 (t, J=7.87 Hz, 2H), 6.53 (t, J=7.32 Hz, 1H), 6.38-6.45 (m, 3H), 6.06 (s, 1H), 5.73 (s, 1H), 5.12 (br.s, 1H), 4.56 (br.s, 1H), 3.50 (s, 3H), 3.15-3.29 (m, 3H), 2.96-3.03 (m, 1H), 2.44-2.53 (m, 1H), 2.26 (s, 3H), 2.23-2.30 (m, 1H), 1.08-1.25 (m, 12H).

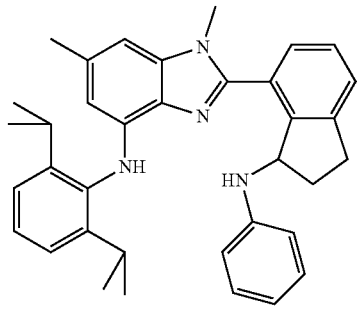

Formula 45

N-(2,6-Diisopropylphenyl)-1,6-dimethyl-2-(3-[(2-methylphenyl)amino]-5,6,7,8-tetrahydronaphthalen-1-yl)-1H-benzimidazol-4-amine (Formula 46)

To a solution of 1.50 g (4.21 mmol) of 2-chloro-N-(2,6-diisopropylphenyl)-1,6-dimethyl-1H-benzimidazol-4-amine in 16 mL of dioxane were added 2.00 g (5.51 mmol) of N-(2-methylphenyl)-8-(4,4,5,5-tetramethyl-1,3,2-dioxaborolan-2-yl)-1,2,3,4-tetrahydronaphthalen-1-amine, 3.43 g (10.53 mmol) of cesium carbonate and 10 mL of water. The resulting mixture was sparged with argon with 30 minutes, followed by an addition of 240 mg (0.211 mmol) of Pd(PPh₃)₄. This mixture was stirred for 12 hours at 95° C. and then cooled to room temperature. To the obtained two-phase mixture was added 100 mL of n-hexane. The n-hexane layer was separated and washed with brine. The resulting solution was dried over Na₂SO₄ and then evaporated to dryness. The residue was purified by flash chromatography on silica gel 60 (40-63 m, eluent: hexane-ethyl acetate-triethylamine=100:10:1, vol.). Yield 1.32 g (56%) of colorless oil. ¹H NMR (CDCl₃): δ 7.28-7.34 (m, 3H), 7.24-7.26 (m, 2H), 7.20 (d, J=6.54 Hz, 1H), 6.84 (d, J=7.43 Hz, 1H), 6.66 (t, J=7.71 Hz, 1H), 6.41 (t, J=7.21 Hz, 1H), 6.28 (s, 1H), 6.13-6.16 (m, 2H), 5.70 (s, 1H), 5.35 (br.s, 1H), 3.52 (br.s, 1H), 3.30 (s, 3H), 3.31 (sept, J=6.06 Hz, 2H), 2.96-3.03 (m, 1H), 2.80-2.90 (m, 1H), 2.21 (s, 3H), 2.05-2.13 (m, 1H), 1.80-1.86 (m, 6H), 1.08-1.25 (m, 12H).

Formula 46

2-(3-(o-Tolylamino)-2,3-dihydro-1H-inden-4-yl)-N-(2,6-diisopropylphenyl)-1,6-dimethyl-1H-benzimidazol-4-amine (Formula 47)

To a solution of 1.50 g (4.21 mmol) of 2-chloro-N-(2,6-diisopropylphenyl)-1,6-dimethyl-1H-benzimidazol-4-amine in 30 mL of dioxane were added 2.83 g (8.45 mmol) of (2-methylphenyl)[7-(4,4,5,5-tetramethyl-1,3,2-dioxaborolan-2-yl)-2,3-dihydro-1H-inden-1-yl]amine, 5.50 g (16.90 mmol) of cesium carbonate and 20 mL of water. The obtained mixture was sparged with argon with 30 minutes, followed by an addition of 240 mg (0.211 mmol) of Pd(PPh$_3$)$_4$. The resulting mixture was stirred for 12 hours at 95° C. and then cooled to room temperature. To the obtained two-phase mixture was added 100 mL of n-hexane. The n-hexane layer was separated and washed with brine. The resulting solution was dried over Na$_2$SO$_4$ and then evaporated to dryness. The residue was purified by flash chromatography on silica gel 60 (40-63 m, eluent: hexane-ethyl acetate-triethylamine=100:10:1, vol.) and then recrystallized from 15 mL of cold n-pentane. Yield 1.40 g (61%) of a white powder. $^1$H NMR (CDCl$_3$): δ 7.40-7.46 (m, 2H), 7.30-7.37 (m, 2H), 7.22-7.26 (m, 2H), 6.94 (t, J=7.43 Hz, 1H), 6.83 (d, J=6.88 Hz, 1H), 6.48-6.55 (m, 2H), 6.38 (s, 1H), 6.02 (s, 1H), 5.71 (s, 1H), 5.25 (dd, J$_1$=6.76 Hz, J$_2$=4.77 Hz, 1H), 4.09 (br.s, 1H), 3.45 (s, 3H), 3.10-3.27 (m, 3H), 2.97-3.06 (m, 1H), 2.52-2.61 (m, 1H), 2.20-2.27 (m, 4H), 1.73 (s, 3H), 1.08-1.25 (m, 12H).

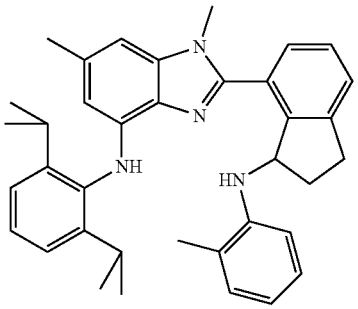

Formula 47

Complex 1.

MeMgBr in diethyl ether (1.50 mL, 2.9 M) was added via syringe to a suspension of HfCl$_4$ (282 mg, 0.882 mmol) in toluene (50 mL) at room temperature. This mixture was stirred until complete dissolution of HfCl$_4$ occurred. Thereafter, a solution of N-(2,6-diisopropylphenyl)-1,6-dimethyl-2-(2-{[(2-methylphenyl)amino]methyl}-1-naphthyl)-1H-benzimidazol-4-amine (500 mg, 0.882 mmol) in toluene (20 mL) was added via syringe at room temperature. The resulting mixture was stirred overnight at room temperature. Next, hexane (20 mL) was added, and the obtained mixture was filtered through a short pad of Celite 503. The filtrate was evaporated to dryness, and the residue was triturated with hexane. The obtained suspension was filtered through a glass frit (G3), and the crystalline precipitate was dried under reduced pressure. The title product was obtained as a light-yellow solid (272 mg, 39%). Anal. Calc. for C$_{41}$H$_{46}$HfN$_4$: C, 63.68; H, 6.00; N, 7.24. Found: C, 63.92; H, 6.15; N, 7.02. $^1$H NMR (400 MHz, CDCl$_3$): δ 7.58 (m, 1H), 7.47 (d, J=8.32 Hz, 1H), 7.31-7.39 (m, 3H), 7.30 (s, 1H), 7.18-7.26 (m, 1H), 7.04-7.14 (m, 3H), 7.00 (s, 3H), 6.82 (d, J=8.21 Hz, 1H), 6.21 (s, 1H), 6.02 (s, 1H), 5.05 (d, J=13.31 Hz, 1H), 4.27 (d, J=7.65 Hz, 1H), 4.08 (d, J=13.31 Hz, 1H), 3.75 (s, 1H), 2.74 (s, 3H), 2.56 (s, 3H), 2.26 (s, 3H), 1.50 (d, J=6.88 Hz, 3H), 1.41 (d, J=6.88 Hz, 3H), 1.33 (d, J=6.88 Hz, 6H), 0.48 (s, 3H), −0.23 (s, 3H).

Complex 2.

A solution of MeMgBr in diethyl ether (1.51 mL, 2.9 M) was added via syringe to a suspension of HfCl$_4$ (320 mg, 1.0 mmol) in toluene (50 mL) at room temperature. This mixture was stirred until complete dissolution of HfCl$_4$ occurred. Thereafter, a solution of 2-(3-anilino-2,3-dihydro-1H-inden-4-yl)-N-(2,6-diisopropylphenyl)-1,6-dimethyl-1H-benzimidazol-4-amine (500 mg, 0.971 mmol) in toluene (20 mL) was added via syringe at room temperature. The resulting mixture was stirred overnight at room temperature. Hexane (20 mL) was added, and the obtained mixture was filtered through a short pad of Celite 503. The filtrate was evaporated to dryness, and the residue was triturated in benzene (50 mL). The formed suspension was passed through the short pad of Celite 503. The filtrate was evaporated to dryness, and the residue was triturated with hot hexane. The resulting suspension was filtered through a glass frit (G3). The obtained precipitate was dried under reduced pressure. The title product was obtained as a light-yellow solid (550 mg, 78%). Anal. Calc. for C$_{38}$H$_{44}$HfN$_4$: C, 62.07; H, 6.03; N, 7.62. Found: C, 62.23; H, 6.18; N, 7.43. $^1$H NMR (400 MHz, CDCl$_3$): δ 7.56 (d, J=7.5 Hz, 1H), 7.46 (t, J=7.5 Hz, 1H), 7.23-7.27 (m, 4H), 7.14-7.19 (m, 2H), 6.82 (m, 2H), 6.41 (s, 1H), 5.69 (m, 1H), 5.60 (s, 1H), 3.98 (s, 3H), 1.12 (m, 1H), 3.25 (m, 1H), 2.40-2.47 (m, 1H), 2.31 (s, 3H), 2.19-2.25 (m, 2H), 1.82-1.88 (m, 1H), 1.27 (d, J=6.9 Hz, 3H), 1.21 (d, J=6.9 Hz, 3H), 1.16 (d, J=6.9 Hz, 3H), 1.00 (d, J=6.9 Hz, 3H), −0.21 (s, 3H), −0.43 (s, 3H). $^{13}$C NMR (100 MHz, CDCl$_3$): δ 150.4, 149.0, 148.3, 146.2, 145.9, 145.7, 144.6, 144.1, 137.8, 133.6, 133.0, 131.5, 128.3, 127.5, 126.7, 126.4, 125.2, 125.1, 123.6, 122.7, 106.6, 96.4, 66.6, 55.8, 32.9, 31.9, 30.2, 28.6, 27.8, 25.8, 25.5, 24.4, 24.0, 22.7.

Complex 3.

A solution of MeMgBr in diethyl ether (1.53 mL, 2.9 M) was added via syringe to a suspension of HfCl$_4$ (296 mg, 0.92 mmol) in toluene (50 mL) at room temperature. This mixture was stirred until complete dissolution of HfCl$_4$ occurred. Thereafter, a solution of 2-(3-(o-tolylamino)-2,3-dihydro-1H-inden-4-yl)-N-(2,6-diisopropylphenyl)-1,6-dimethyl-1H-benzimidazol-4-amine (500 mg, 0.920 mmol) in toluene (20 mL) was added via syringe at room temperature. The resulting mixture was stirred overnight at room temperature. Hexane (20 mL) was added, and the obtained mixture was filtered through a short pad of Celite 503. The filtrate was evaporated to dryness, and the residue was triturated with hexane. The resulting suspension was filtered through a glass frit (G3). The precipitate was dried under reduced pressure. The title product was obtained as a light-yellow solid (442 mg, 64%). Anal. Calc. for C$_{39}$H$_{46}$HfN$_4$: C, 62.51; H, 6.19; N, 7.48. Found: C, 62.85; H, 6.45; N, 7.23. $^1$H NMR (400 MHz, CDCl$_3$): δ 7.50 (d, J=7.43 Hz, 1H), 7.43 (t, J=7.53 Hz, 1H), 7.16-7.34 (m, 5H), 7.12 (t, J=7.53 Hz, 1H), 6.92-7.00 (m, 1H), 6.73 (d, J=7.83 Hz, 1H), 6.42 (s, 1H), 5.67 (d, J=5.09 Hz, 1H), 5.60 (s, 1H), 3.99 (s, 3H), 3.60-3.74 (m, 1H), 3.26-3.41 (m, 1H), 2.19-2.48 (m, 7H), 1.96-2.19 (m, 3H), 1.23-1.34 (m, 3H), 1.20 (d, J=6.85 Hz, 3H), 1.14 (d, J=6.85 Hz, 3H), 0.97-1.08 (m, 3H), −0.14 (s, 3H), −0.79 (s, 3H). $^{13}$C NMR (100 MHz, CDCl$_3$): δ 150.31, 149.79, 148.42, 146.28, 145.82, 145.48, 144.43, 142.04, 141.05, 137.67, 133.77, 132.79, 131.43, 130.94, 129.02, 128.21, 127.42, 126.75, 126.07, 125.92, 125.65, 125.28, 125.05, 123.56, 123.32, 122.88, 106.29, 96.46, 67.75, 56.76, 53.46, 32.56, 32.21, 30.24, 28.70, 27.86, 25.70, 25.68, 24.29, 23.78, 22.77, 19.01.

Complex 4.

A solution of MeMgBr in diethyl ether (1.50 mL, 2.9 M) was added via syringe to a suspension of HfCl$_4$ (287 mg, 0.898 mmol) in toluene (50 mL) at room temperature. The mixture was stirred until complete dissolution of HfCl$_4$ occurred. Thereafter, a solution of N-(2,6-diisopropylphenyl)-1,6-dimethyl-2-(3-[(2-methylphenyl)amino]-5,6,7,8- tetrahydronaphthalen-1-yl)-1H-benzimidazol-4-amine (500 mg, 0.898 mmol) in toluene (20 mL) was added via syringe at room temperature. The resulting mixture was stirred overnight at room temperature. Hexane (20 mL) was added, and the obtained suspension was filtered through a short pad of Celite 503. The filtrate was evaporated to dryness, and the residue was triturated with hexane. The obtained suspension was filtered through a glass frit (G3). The precipitate was dried under reduced pressure. The title product was obtained as a light-yellow solid (375 mg, 55%). Anal. Calc. for $C_{40}H_{48}HfN_4$: C, 62.94; H, 6.34; N, 7.34. Found: C, 63.31; H, 6.62; N, 7.12. $^1$H NMR (400 MHz, $CDCl_3$): δ 7.25-7.42 (m, 4H), 7.09-7.15 (m, 1H), 6.94-7.09 (m, 4H), 6.88 (d, J=6.65 Hz, 2H), 6.68-6.82 (m, 2H), 6.09 (s, 1H), 5.97 (s, 1H), 5.49 (dd, J=2.61, 6.15 Hz, 1H), 4.10-4.31 (m, 1H), 3.58-3.81 (m, 1H), 2.84 (s, 3H), 2.59 (br. s., 2H), 2.13-2.35 (m, 7H), 1.62-1.77 (m, 2H), 1.50 (d, J=6.88 Hz, 3H), 1.44 (d, J=6.88 Hz, 3H), 1.35 (d, J=6.76 Hz, 3H), 1.26 (d, J=6.88 Hz, 3H), 1.03-1.18 (m, 3H), 0.40 (s, 3H), −0.08-0.22 (br.s., 3H).

Polymerization Examples

Solvents, polymerization grade toluene and/or isohexanes were supplied by ExxonMobil Chemical Co. and were purified by passing through a series of columns: two 500 cc Oxyclear cylinders in series from Labclear (Oakland, Calif.), followed by two 500 cc columns in series packed with dried 3 Å molecular sieves (8-12 mesh; Aldrich Chemical Company), and two 500 cc columns in series packed with dried 5 Å molecular sieves (8-12 mesh; Aldrich Chemical Company). v 1-Octene (98%) (Aldrich Chemical Company) was dried by stirring over Na—K alloy overnight followed by filtration through basic alumina (Aldrich Chemical Company, Brockman Basic 1). Tri-(n-octyl)aluminum (TNOA) was purchased from either Aldrich Chemical Company or Akzo Nobel and used as received.

Polymerization grade ethylene was further purified by passing it through a series of columns: 500 cc Oxyclear cylinder from Labclear (Oakland, Calif.) followed by a 500 cc column packed with dried 3 Å molecular sieves (8-12 mesh; Aldrich Chemical Company), and a 500 cc column packed with dried 5 Å molecular sieves (8-12 mesh; Aldrich Chemical Company).

Polymerization grade propylene was further purified by passing it through a series of columns: 2,250 cc Oxiclear cylinder from Labclear followed by a 2,250 cc column packed with 3 Å molecular sieves (8-12 mesh; Aldrich Chemical Company), then two 500 cc columns in series packed with 5 Å molecular sieves (8-12 mesh; Aldrich Chemical Company), a 500 cc column packed with Selexsorb CD (BASF), and finally a 500 cc column packed with Selexsorb COS (BASF).

Methylalumoxane (MAO) was purchased from Albemarle Corporation as a 10 wt. % in toluene. N,N-Dimethyanilinium tetrakis(pentafluorophenyl)borate (BF20) was purchased from Albemarle Corporation. All complexes and the activators were added to the reactor as dilute solutions in toluene. The concentrations of the solutions of activator, scavenger, and complexes that were added to the reactor were chosen so that between 40-200 microliters of the solution were added to the reactor to ensure accurate delivery.

Reactor Description and Preparation.

Polymerizations were conducted in an inert atmosphere ($N_2$) drybox using autoclaves equipped with an external heater for temperature control, glass inserts (internal volume of reactor=23.5 mL for $C_2$ and $C_2/C_8$ runs; 22.5 mL for $C_3$ runs), septum inlets, regulated supply of nitrogen, ethylene and propylene, and equipped with disposable polyether ether ketone (PEEK) mechanical stirrers (800 RPM). The autoclaves were prepared by purging with dry nitrogen at 110° C. or 115° C. for 5 hours and then at 25° C. for 5 hours.

Ethylene Polymerization (PE) or Ethylene/1-Octene Copolymerization (EO).

The reactor was prepared as described above, and then purged with ethylene. Toluene, optional 1-octene (100 μL when used), and optional MAO were added via syringe at room temperature and atmospheric pressure. The reactor was then brought to process temperature (typically 80° C.) and charged with ethylene to process pressure (typically 75 psig=618.5 kPa or 200 psig=1480.3 kPa) while stirring at 800 RPM. An optional scavenger solution (e.g., TNOA) was then added via syringe to the reactor at process conditions. An optional non-coordinating activator (e.g., BF20) solution was added via syringe to the reactor at process conditions, followed by a pre-catalyst (i.e., complex) solution via syringe to the reactor at process conditions. Ethylene was allowed to enter (through the use of computer controlled solenoid valves) the autoclaves during polymerization to maintain reactor gauge pressure (+/−2 psi). Reactor temperature was monitored and typically maintained within +/−1° C. Polymerizations were halted by addition of approximately 50 psi $O_2$/Ar (5 mole % $O_2$) gas mixture to the autoclaves for approximately 30 seconds. The polymerizations were quenched after a predetermined cumulative amount of ethylene had been added or for a maximum of 30 minutes polymerization time. The reactors were cooled and vented. The polymer was isolated after the solvent was removed in vacuo. Yields reported include total weight of polymer and residual catalyst. Catalyst activity is reported as grams of polymer per mmol transition metal compound per hour of reaction time (g/mmol/hr).

Propylene Polymerization.

The reactor was prepared as described above, then heated to 40° C. and purged with propylene gas at atmospheric pressure. Toluene, optional MAO, and liquid propylene (1.0 mL) were added via syringe. The reactor was then heated to process temperature (70° C. or 100° C.) while stirring at 800 RPM. Then optional scavenger solution (e.g., TNOA) was added via syringe to the reactor at process conditions. Optional non-coordinating activator (e.g., BF20) solution was then added via syringe to the reactor at process conditions, followed by a pre-catalyst (i.e., complex) solution via syringe to the reactor at process conditions. Reactor temperature was monitored and typically maintained within +/−1° C. Polymerizations were halted by addition of approximately 50 psi $O_2$/Ar (5 mole % $O_2$) gas mixture to the autoclaves for approximately 30 seconds. The polymerizations were quenched based on a predetermined pressure loss of approximately 8 psi or for a maximum of 30 minutes polymerization time. The reactors were cooled and vented. The polymer was isolated after the solvent was removed in vacuo. Yields reported include total weight of polymer and residual catalyst. Catalyst activities are typically reported as grams of polymer per mmol transition metal compound per hour of reaction time (g/mmol/hr). A catalyst activity of 0 indicates that an immeasurably small amount of polymer was obtained in that particular run.

Polymer Characterization.

For analytical testing, polymer sample solutions were prepared by dissolving the polymer in 1,2,4-trichlorobenzene (TCB, 99+% purity from Sigma-Aldrich) containing 2,6-di-tert-butyl-4-methylphenol (BHT, 99% from Aldrich)

at 165° C. in a shaker oven for approximately 3 hours. The typical concentration of polymer in solution was between 0.1 to 0.9 mg/mL with a BHT concentration of 1.25 mg BHT/mL of TCB. Samples were cooled to 135° C. for testing.

High temperature size exclusion chromatography was performed using an automated "Rapid GPC" system as described in U.S. Pat. Nos. 6,491,816; 6,491,823; 6,475,391; 6,461,515; 6,436,292; 6,406,632; 6,175,409; 6,454,947; 6,260,407; and 6,294,388; each of which is incorporated herein by reference. Molecular weights (weight average molecular weight (Mw) and number average molecular weight (Mn)) and molecular weight distribution (MWD=Mw/Mn), which is also sometimes referred to as the polydispersity (PDI) of the polymer, were measured by Gel Permeation Chromatography using a Symyx Technology GPC equipped with evaporative light scattering detector and calibrated using polystyrene standards (Polymer Laboratories: Polystyrene Calibration Kit S-M-10: Mp (peak Mw) between 5,000 and 3,390,000). Samples (250 μL of a polymer solution in TCB were injected into the system) were run at an eluent flow rate of 2.0 mL/minute (135° C. sample temperatures, 165° C. oven/columns) using three Polymer Laboratories: PLgel 10 μm Mixed-B 300×7.5 mm columns in series. No column spreading corrections were employed. Numerical analyses were performed using Epoch® software available from Symyx Technologies or Automation Studio software available from Freeslate. The molecular weights obtained are relative to linear polystyrene standards.

Differential Scanning Calorimetry (DSC) measurements were performed on a TA-Q100 instrument to determine the melting point of the polymers. Samples were pre-annealed at 220° C. for 15 minutes and then allowed to cool to room temperature overnight. The samples were then heated to 220° C. at a rate of 100° C./minute and then cooled at a rate of 50° C./minute. Melting points were collected during the heating period.

Samples for infrared analysis were prepared by depositing the stabilized polymer solution onto a silanized wafer (Part number S10860, Symyx). By this method, approximately between 0.12 and 0.24 mg of polymer was deposited on the wafer cell. The samples were subsequently analyzed on a Bruker Equinox 55 FTIR spectrometer equipped with Pikes' MappIR specular reflectance sample accessory. Spectra, covering a spectral range of 5,000 $cm^{-1}$ to 500 $cm^{-1}$, were collected at a 2 $cm^{-1}$ resolution with 32 scans.

For ethylene-1-octene copolymers, the wt. % copolymer was determined via measurement of the methyl deformation band at ~1,375 $cm^{-1}$. The peak height of this band was normalized by the combination and overtone band at ~4,321 $cm^{1}$, which corrects for path length differences. The normalized peak height was correlated to individual calibration curves from $^1$H NMR data to predict the wt. % copolymer content within a concentration range of ~2 to 35 wt. % for octene. Typically, $R^2$ correlations of 0.98 or greater were achieved. Reported values below 4.1 wt. % are outside the calibration range.

Polymerization conditions and characterization data for the high-throughput polymerizations are summarized in Tables 1A-5B below.

TABLE 1A

Ethylene Polymerization Data

| Run # | Complex (Activator) | Quench Time (s) | Yield (g) | Activity (g/mmol cat/hr) |
|---|---|---|---|---|
| 1 | 1 (BF20) | 151 | 0.0473 | 45,107 |
| 2 | 1 (BF20) | 126 | 0.0615 | 70,286 |
| 3 | 1 (BF20) | 128 | 0.0525 | 59,063 |
| 4 | 1 (MAO) | 134 | 0.0807 | 86,722 |
| 5 | 1 (MAO) | 96 | 0.0803 | 120,450 |
| 6 | 1 (MAO) | 96 | 0.0778 | 116,700 |
| 7 | 2 (BF20) | 883 | 0.0354 | 5,773 |
| 8 | 2 (BF20) | 623 | 0.0304 | 7,027 |
| 9 | 2 (BF20) | 787 | 0.032 | 5,855 |
| 10 | 2 (MAO) | 1296 | 0.0362 | 4,022 |
| 11 | 2 (MAO) | 1217 | 0.0381 | 4,508 |
| 12 | 2 (MAO) | 1199 | 0.033 | 3,963 |
| 13 | 3 (BF20) | 302 | 0.0327 | 15,592 |
| 14 | 3 (BF20) | 312 | 0.0443 | 20,446 |
| 15 | 3 (BF20) | 253 | 0.0439 | 24,987 |
| 16 | 3 (MAO) | 230 | 0.0531 | 33,245 |
| 17 | 3 (MAO) | 248 | 0.0578 | 33,561 |
| 18 | 3 (MAO) | 328 | 0.0631 | 27,702 |
| 19 | 4 (BF20) | 76 | 0.0549 | 104,021 |
| 20 | 4 (BF20) | 74 | 0.0523 | 101,773 |
| 21 | 4 (BF20) | 75 | 0.0497 | 95,424 |
| 22 | 4 (MAO) | 55 | 0.0688 | 180,131 |
| 23 | 4 (MAO) | 61 | 0.076 | 179,410 |
| 24 | 4 (MAO) | 63 | 0.0711 | 162,514 |

General conditions: complex = 25 nmol, 75 psi ethylene, temperature = 80° C., solvent = toluene, and quench pressure = 20 psid. For runs using MAO activator: MAO = 12,500 nmol. For runs using BF20 activator: BF20 = 27.5 nmol, and Al(n-octyl)$_3$ = 500 nmol.

TABLE 1B

Ethylene Polymer Characterization Data

| Run # | Mn | Mw | Mz | Mw/Mn | Tc (° C.) | Tm (° C.) |
|---|---|---|---|---|---|---|
| 1 | 295,192 | 537,334 | 1,377,239 | 1.8 | 116 | 137 |
| 2 | 250,289 | 503,864 | 1,407,290 | 2.0 | 116 | 137 |
| 3 | 233,339 | 436,017 | 1,114,267 | 1.9 | 116 | 137 |
| 4 | 102,273 | 174,749 | 327,814 | 1.7 | 116 | 136 |
| 5 | 112,638 | 175,209 | 316,144 | 1.6 | 116 | 136 |
| 6 | 127,823 | 195,298 | 349,429 | 1.5 | 117 | 136 |
| 7 | 233,155 | 1,101,281 | 5,573,510 | 4.7 | 117 | 137 |
| 8 | 225,953 | 1,181,471 | 5,481,340 | 5.2 | 117 | 137 |
| 9 | 201,779 | 1,049,354 | 5,782,629 | 5.2 | 117 | 137 |
| 10 | 60,480 | 892,482 | 6,577,887 | 14.8 | 116 | 134 |
| 11 | 64,637 | 810,992 | 8,823,266 | 12.6 | 116 | 134 |
| 12 | 39,305 | 614,095 | 12,501,057 | 15.6 | 116 | 134 |
| 13 | 262,882 | 1,070,346 | 5,008,815 | 4.1 | 117 | 137 |
| 14 | 273,523 | 1,287,986 | 6,990,100 | 4.7 | 116 | 137 |

TABLE 1B-continued

Ethylene Polymer Characterization Data

| Run # | Mn | Mw | Mz | Mw/Mn | Tc (° C.) | Tm (° C.) |
|---|---|---|---|---|---|---|
| 15 | 299,084 | 1,159,382 | 4,875,742 | 3.9 | 117 | 137 |
| 16 | 69,316 | 688,299 | 4,077,100 | 9.9 | 116 | 134 |
| 17 | 53,672 | 714,209 | 5,340,814 | 13.3 | 116 | 135 |
| 18 | 93,635 | 684,001 | 3,852,642 | 7.3 | 117 | 134 |
| 19 | 255,746 | 439,628 | 959,508 | 1.7 | 117 | 137 |
| 20 | 271,819 | 434,379 | 857,743 | 1.6 | 117 | 138 |
| 21 | 261,676 | 424,791 | 884,781 | 1.6 | 117 | 137 |
| 22 | 41,197 | 106,116 | 361,775 | 2.6 | 115 | 131 |
| 23 | 44,861 | 102,409 | 359,131 | 2.3 | 115 | 131 |
| 24 | 37,780 | 90,839 | 228,090 | 2.4 | 114 | 131 |

TABLE 2A

Ethylene-Octene Copolymerization Data

| Run # | Complex (Activator) | Ethylene Pressure (psig) | Quench Time (s) | Yield (g) | Activity (g/mmol cat/hr) |
|---|---|---|---|---|---|
| 25 | 1 (MAO) | 75 | 82 | 0.0574 | 100,800 |
| 26 | 1 (MAO) | 75 | 77 | 0.0735 | 137,455 |
| 27 | 1 (MAO) | 75 | 73 | 0.0665 | 131,178 |
| 28 | 1 (MAO) | 200 | 69 | 0.1275 | 266,087 |
| 29 | 1 (MAO) | 200 | 51 | 0.1227 | 346,447 |
| 30 | 1 (MAO) | 200 | 72 | 0.1307 | 261,400 |
| 31 | 2 (MAO) | 75 | 1517 | 0.0396 | 3,759 |
| 32 | 2 (MAO) | 75 | 1569 | 0.0281 | 2,579 |
| 33 | 2 (MAO) | 75 | 1033 | 0.0335 | 4,670 |
| 34 | 2 (MAO) | 200 | 500 | 0.0275 | 7,920 |
| 35 | 2 (MAO) | 200 | 406 | 0.0231 | 8,193 |
| 36 | 3 (MAO) | 75 | 413 | 0.0363 | 12,657 |
| 37 | 3 (MAO) | 75 | 398 | 0.0373 | 13,495 |
| 38 | 3 (MAO) | 75 | 353 | 0.0362 | 14,767 |
| 39 | 3 (MAO) | 200 | 81 | 0.0491 | 87,289 |
| 40 | 3 (MAO) | 200 | 72 | 0.0466 | 93,200 |
| 41 | 4 (MAO) | 75 | 69 | 0.0665 | 138,783 |
| 42 | 4 (MAO) | 75 | 50 | 0.0789 | 227,232 |
| 43 | 4 (MAO) | 75 | 64 | 0.0716 | 161,100 |
| 44 | 4 (MAO) | 200 | 25 | 0.1141 | 657,216 |
| 45 | 4 (MAO) | 200 | 24 | 0.1212 | 727,200 |
| 46 | 4 (MAO) | 200 | 28 | 0.1158 | 595,543 |

General conditions: 1-octene = 0.1 mL, complex = 25 nmol, temperature = 80° C., solvent = toluene, MAO = 12,500 nmol, quench pressure = 20 psid when 75 psig ethylene was used and = 15 psid when 200 psgi ethylene was used.

TABLE 2B

Ethylene-Octene Copolymer Characterization Data

| Run # | Mn | Mw | Mz | Mw/Mn | Octene (wt. %) | Tc (° C.) | Tm (° C.) |
|---|---|---|---|---|---|---|---|
| 25 | 76,728 | 120,482 | 214,797 | 1.6 | 11.5 | 106 | 121 |
| 26 | 77,834 | 122,128 | 227,099 | 1.6 | 8.1 | 105 | 120 |
| 27 | 78,459 | 121,458 | 219,908 | 1.6 | 7.9 | 105 | 120 |
| 28 | 147,208 | 237,118 | 486,157 | 1.6 | 10.1 | 111 | 127 |
| 29 | 131,520 | 219,353 | 450,586 | 1.7 | 8.0 | 111 | 127 |
| 30 | 143,519 | 222,719 | 423,493 | 1.6 | 5.9 | 111 | 126 |
| 31 | 21,134 | 267,473 | 4,287,639 | 12.7 | 6.0 | 111 | 126 |
| 32 | 14,206 | 398,268 | 7,280,095 | 28.0 | 7.8 | 111 | 126 |
| 33 | 30,880 | 649,303 | 14,516,266 | 21.0 | 7.6 | 111 | 125 |
| 34 | 17,296 | 501,100 | 5,892,489 | 29.0 | 19.7 | 114 | 130 |
| 35 | 16,964 | 711,300 | 10,845,492 | 41.9 | 14.3 | 114 | 130 |
| 36 | 34,108 | 110,654 | 725,358 | 3.2 | 4.1 | 108 | 123 |
| 37 | 25,706 | 86,812 | 722,769 | 3.4 | 4.6 | 109 | 123 |
| 38 | 28,314 | 116,813 | 770,822 | 4.1 | 5.7 | 109 | 123 |
| 39 | 70,414 | 180,716 | 825,976 | 2.6 | 5.2 | 113 | 126 |
| 40 | 43,800 | 193,297 | 1,775,988 | 4.4 | 3.8 | 112 | 125 |
| 41 | 32,407 | 70,743 | 176,359 | 2.2 | 10.2 | 89 | 101 |
| 42 | 33,498 | 69,556 | 174,193 | 2.1 | 14.7 | 81 | 101 |
| 43 | 30,216 | 70,680 | 203,178 | 2.3 | 12.5 | 86 | 102 |
| 44 | 39,434 | 94,123 | 227,492 | 2.4 | 8.9 | 102 | 117 |
| 45 | 52,582 | 102,589 | 255,050 | 2.0 | 7.2 | 101 | 117 |
| 46 | 44,143 | 101,393 | 277,794 | 2.3 | 7.5 | 102 | 118 |

TABLE 3A

Ethylene-Octene Copolymerization Data

| Run # | Complex (Activator) | Ethylene Pressure (psig) | Quench Time (s) | Yield (g) | Activity (g/mmol cat/hr) |
|---|---|---|---|---|---|
| 47 | 1 (BF20) | 75 | 139 | 0.0354 | 36,673 |
| 48 | 1 (BF20) | 75 | 128 | 0.0327 | 36,788 |
| 49 | 1 (BF20) | 75 | 182 | 0.0326 | 25,793 |
| 50 | 1 (BF20) | 200 | 38 | 0.0652 | 247,074 |
| 51 | 1 (BF20) | 200 | 48 | 0.0615 | 184,500 |
| 52 | 1 (BF20) | 200 | 44 | 0.0651 | 213,055 |
| 53 | 2 (BF20) | 75 | 544 | 0.0336 | 8,894 |
| 54 | 2 (BF20) | 75 | 738 | 0.0375 | 7,317 |
| 55 | 2 (BF20) | 75 | 562 | 0.0347 | 8,891 |
| 56 | 2 (BF20) | 200 | 222 | 0.0422 | 27,373 |
| 57 | 2 (BF20) | 200 | 260 | 0.0475 | 26,308 |
| 58 | 3 (BF20) | 75 | 482 | 0.0374 | 11,173 |
| 59 | 3 (BF20) | 75 | 626 | 0.0304 | 6,993 |
| 60 | 3 (BF20) | 75 | 543 | 0.0401 | 10,634 |
| 61 | 3 (BF20) | 200 | 279 | 0.0675 | 34,839 |
| 62 | 3 (BF20) | 200 | 349 | 0.0834 | 34,411 |
| 63 | 3 (BF20) | 200 | 231 | 0.0618 | 38,525 |
| 64 | 4 (BF20) | 75 | 101 | 0.0453 | 64,586 |
| 65 | 4 (BF20) | 75 | 74 | 0.0471 | 91,654 |
| 66 | 4 (BF20) | 75 | 95 | 0.0449 | 68,059 |
| 67 | 4 (BF20) | 200 | 69 | 0.0753 | 157,148 |
| 68 | 4 (BF20) | 200 | 96 | 0.0958 | 143,700 |
| 69 | 4 (BF20) | 200 | 83 | 0.077 | 133,590 |

General conditions: 1-octene = 0.1 mL, complex = 25 nmol, temperature = 80° C., solvent = toluene, BF20 = 27.5 nmol, Al(n-octyl)$_3$ = 500 nmol, and quench pressure = 20 psid when 75 psig ethylene was used and =15 psid when 200 psig ethylene was used.

TABLE 3B

Ethylene-Octene Copolymer Characterization Data

| Run # | Mn | Mw | Mz | Mw/Mn | Octene (wt. %) | Tc (° C.) | Tm (° C.) |
|---|---|---|---|---|---|---|---|
| 47 | 138,706 | 261,112 | 709,455 | 1.9 | 3.0 | 109 | 123 |
| 48 | 132,253 | 247,112 | 591,974 | 1.9 | 3.1 | 109 | 123 |
| 49 | 152,486 | 260,982 | 540,915 | 1.7 | 3.1 | 109 | 124 |
| 50 | 269,535 | 450,188 | 930,321 | 1.7 | 2.1 | 112 | 128 |
| 51 | 237,152 | 438,656 | 973,357 | 1.9 | 2.3 | 114 | 129 |
| 52 | 270,183 | 463,978 | 965,592 | 1.7 | 2.1 | 113 | 128 |
| 53 | 154,162 | 841,426 | 5,836,643 | 5.5 | 3.2 | 112 | 127 |
| 54 | 224,231 | 1,211,932 | 4,977,195 | 5.4 | 4.7 | 111 | 126 |
| 55 | 125,402 | 831,849 | 5,207,190 | 6.6 | 3.7 | 111 | 126 |
| 56 | 236,116 | 1,409,779 | 5,610,654 | 6.0 | 3.8 | 112 | 127 |
| 57 | 242,696 | 1,453,665 | 5,811,157 | 6.0 | 3.5 | 112 | 127 |
| 58 | 211,185 | 1,140,364 | 6,933,800 | 5.4 | 4.1 | 110 | 124 |
| 59 | 195,033 | 1,155,710 | 8,647,383 | 5.9 | 3.6 | 110 | 124 |
| 60 | 157,608 | 1,138,850 | 7,262,294 | 7.2 | 3.7 | 111 | 124 |
| 61 | 313,160 | 1,299,934 | 7,415,289 | 4.2 | 2.7 | 113 | 127 |
| 62 | 240,497 | 1,504,749 | 11,925,056 | 6.3 | 2.6 | 113 | 127 |
| 63 | 263,898 | 1,178,172 | 6,729,844 | 4.5 | 2.5 | 113 | 127 |
| 64 | 249,590 | 433,052 | 955,480 | 1.7 | 6.5 | 101 | 114 |
| 65 | 212,700 | 377,749 | 860,797 | 1.8 | 6.4 | 100 | 114 |
| 66 | 242,798 | 430,754 | 1,010,454 | 1.8 | 6.3 | 101 | 115 |
| 67 | 366,453 | 656,009 | 1,290,486 | 1.8 | 3.4 | 109 | 123 |
| 68 | 428,196 | 761,234 | 1,684,212 | 1.8 | 3.2 | 109 | 122 |
| 69 | 385,792 | 749,572 | 1,711,800 | 1.9 | 3.1 | 109 | 124 |

TABLE 4A

Propylene Polymerization Data

| Run # | Complex (Activator) | Temperature (° C.) | Quench Time (s) | Yield (g) | Activity (g/mmol cat/h) |
|---|---|---|---|---|---|
| 70 | 2/MAO | 70 | 1,801 | 0.0088 | 440 |
| 71 | 2/MAO | 70 | 1,801 | 0.0079 | 395 |
| 72 | 2/MAO | 100 | 1,800 | 0.0059 | 295 |
| 73 | 2/MAO | 100 | 1,802 | 0.0055 | 275 |
| 74 | 2/MAO | 100 | 1,800 | 0.0055 | 275 |
| 75 | 2/MAO | 70 | 1,801 | 0.0065 | 325 |
| 76 | 3/MAO | 70 | 1,800 | 0.0036 | 180 |
| 77 | 3/MAO | 70 | 1,800 | 0.0029 | 145 |
| 78 | 3/MAO | 100 | 1,801 | 0.0029 | 145 |
| 79 | 3/MAO | 100 | 1,802 | 0.0031 | 155 |
| 80 | 3/MAO | 100 | 1,803 | 0.0033 | 165 |
| 81 | 3/MAO | 70 | 1,800 | 0.0032 | 160 |
| 82 | 4/MAO | 70 | 1,801 | 0.0129 | 645 |
| 83 | 4/MAO | 70 | 1,801 | 0.0143 | 715 |
| 84 | 4/MAO | 100 | 1,800 | 0.0045 | 225 |
| 85 | 4/MAO | 100 | 1,800 | 0.0047 | 235 |
| 86 | 4/MAO | 100 | 1,802 | 0.0047 | 235 |
| 87 | 4/MAO | 70 | 1,801 | 0.0138 | 690 |

General conditions: complex = 40 nmol, propylene = 1 mL, solvent = toluene, MAO = 20,000 nmol.

TABLE 4B

Propylene Polymer Characterization Data

| Run # | Mn | Mw | Mz | Mw/Mn |
|---|---|---|---|---|
| 70 | — | — | — | — |
| 71 | — | — | — | — |
| 72 | — | — | — | — |
| 73 | — | — | — | — |
| 74 | — | — | — | — |
| 75 | — | — | — | — |
| 76 | — | — | — | — |
| 77 | — | — | — | — |
| 78 | — | — | — | — |
| 79 | — | — | — | — |
| 80 | — | — | — | — |
| 81 | — | — | — | — |
| 82 | 4,486 | 12,119 | 38,400 | 2.7 |
| 83 | 4,910 | 12,078 | 30,683 | 2.5 |
| 84 | — | — | — | — |
| 85 | — | — | — | — |
| 86 | — | — | — | — |
| 87 | 5,374 | 13,801 | 38,691 | 2.6 |

TABLE 5A

Propylene Polymerization Data

| Run # | Complex (Activator) | Temp (° C.) | Quench Time (s) | Yield (g) | Activity (g/mmol cat/h) |
|---|---|---|---|---|---|
| 88 | 1 (BF20) | 70 | 1,801 | 0.0114 | 911 |
| 89 | 1 (BF20) | 70 | 1,800 | 0.0136 | 1,088 |
| 90 | 1 (BF20) | 100 | 1,801 | 0.0011 | 88 |
| 91 | 1 (BF20) | 100 | 1,800 | 0.0021 | 168 |
| 92 | 1 (BF20) | 100 | 1,801 | 0.0019 | 152 |
| 93 | 1 (BF20) | 70 | 1,800 | 0.0150 | 1,200 |
| 94 | 2 (BF20) | 70 | 1,801 | 0.0291 | 2,327 |
| 95 | 2 (BF20) | 70 | 1,800 | 0.0316 | 2,528 |
| 96 | 2 (BF20) | 100 | 1,800 | 0.0078 | 624 |
| 97 | 2 (BF20) | 100 | 1,800 | 0.0146 | 1,168 |
| 98 | 2 (BF20) | 100 | 1,801 | 0.0157 | 1,255 |
| 99 | 2 (BF20) | 70 | 1,801 | 0.0300 | 2,399 |
| 100 | 3 (BF20) | 70 | 1,800 | 0.0002 | 16 |
| 101 | 3 (BF20) | 70 | 1,801 | 0.0003 | 24 |
| 102 | 3 (BF20) | 100 | 1,801 | 0 | 0 |
| 103 | 3 (BF20) | 100 | 1,801 | 0 | 0 |
| 104 | 3 (BF20) | 100 | 1,800 | 0 | 0 |
| 105 | 3 (BF20) | 70 | 1,801 | 0.0004 | 32 |
| 106 | 4 (BF20) | 70 | 1,800 | 0.0013 | 104 |
| 107 | 4 (BF20) | 70 | 1,800 | 0.0015 | 120 |
| 108 | 4 (BF20) | 100 | 1,801 | 0 | 0 |
| 109 | 4 (BF20) | 100 | 1,800 | 0 | 0 |
| 110 | 4 (BF20) | 100 | 1,801 | 0 | 0 |
| 111 | 4 (BF20) | 70 | 1,801 | 0.0016 | 128 |

General conditions: complex = 40 nmol, propylene = 1 mL, temp = 80° C., solvent = isohexane, BF20 = 44 nmol, and Al(n-octyl)$_3$ = 500 nmol.

TABLE 5B

Propylene Polymer Characterization Data

| Run # | Mn | Mw | Mz | Mw/Mn |
|---|---|---|---|---|
| 88 | 3,153 | 8,054 | 19,843 | 2.6 |
| 89 | 3,685 | 8,159 | 18,825 | 2.2 |
| 90 | — | — | — | — |
| 91 | — | — | — | — |
| 92 | — | — | — | — |
| 93 | 2,896 | 8,182 | 21,719 | 2.8 |
| 94 | 895,767 | 2,515,771 | 5,663,438 | 2.8 |
| 95 | 770,914 | 2,341,485 | 5,139,537 | 3.0 |
| 96 | — | — | — | — |
| 97 | 109,241 | 308,030 | 934,973 | 2.8 |
| 98 | 137,388 | 348,873 | 917,531 | 2.5 |
| 99 | 1,195,460 | 2,605,907 | 5,328,530 | 2.2 |
| 100 | — | — | — | — |
| 101 | — | — | — | — |
| 102 | — | — | — | — |
| 103 | — | — | — | — |
| 104 | — | — | — | — |
| 105 | — | — | — | — |
| 106 | — | — | — | — |
| 107 | — | — | — | — |
| 108 | — | — | — | — |
| 109 | — | — | — | — |
| 110 | — | — | — | — |
| 111 | — | — | — | — |

As shown in Tables 1A and 1B, Complexes 1 through 4, each in combination with MAO or BF20, formed active catalysts for the polymerization of ethylene. These same catalysts systems were found to copolymerize ethylene and 1-octene (Tables 2A, 2B, 3A, and 3B). As shown in Tables 4A, 4B, 5A, and 5B certain complex and activator combinations (complex 4 with MAO, complex 1 with BF20, and complex 2 with BF20, for example) were found to be active for the polymerization of propylene.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is:

1. A transition metal complex having a formula of:

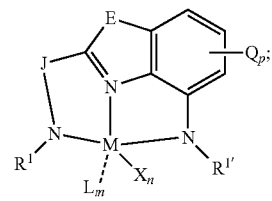

wherein:

M is a transition metal;

E is $NR^2$, $CR^3R^4$, O, S, or $SiR^5R^6$;

Q is optional substitution selected from the group consisting of a hydrocarbyl group, a heteroatom substituent, and any combination thereof;

p is an integer ranging from 0 to 3;

L is an optional neutral ligand, with two L optionally being joined together to form a bidentate neutral ligand;

m is an integer ranging from 0 to 3;

X is an anionic leaving group, with two X optionally being joined together to form a dianionic leaving group;

n is 1 or 2;

wherein a sum of m+n is 4 or less;

J is a linker group contributing two or three atoms that are located within a first chelate ring;

$R^1$ and $R^{1'}$ are independently selected from the group consisting of a hydrocarbyl group and a trihydrocarbylsilyl group;

$R^2$ is a hydrocarbyl group;

$R^3$ and $R^4$ are independently selected from the group consisting of H, a hydrocarbyl group, and a trihydrocarbylsilyl group; and $R^5$ and $R^6$ are independently a hydrocarbyl group.

2. The transition metal complex of claim 1, wherein:

$R^1$ and $R^{1'}$ are independently selected from the group consisting of an alkyl group, an aryl group, and a trihydrocarbylsilyl group;

$R^2$ is an alkyl group or an aryl group;

$R^3$ and $R^4$ are independently selected from the group consisting of H, an alkyl group, an aryl group, and a trihydrocarbylsilyl group; and $R^5$ and $R^6$ are independently selected from the group consisting of an alkyl group and an aryl group.

3. The transition metal complex of claim 1, wherein M is a group 4 transition metal.

4. The transition metal complex of claim 3, wherein M is Hf.

5. The transition metal complex of claim 3, wherein $R^1$ and $R^{1'}$ are each an aryl group.

6. The transition metal complex of claim 3, wherein J contributes three atoms that are located within the first chelate ring.

7. The transition metal complex of claim 3, wherein J is selected from the group consisting of

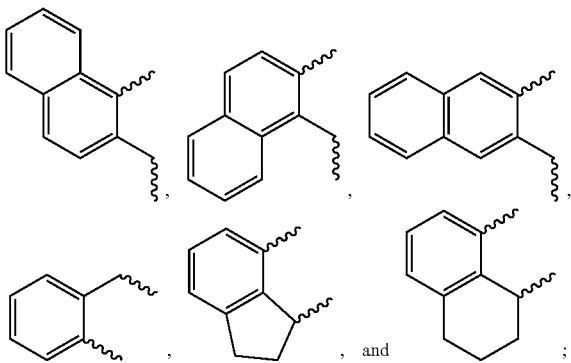

wherein each wavy bond indicates a point of connectivity within the first chelate ring.

8. The transition metal complex of claim 3, wherein E is $NR^2$.

9. The transition metal complex of claim 8, wherein $R^2$ is an alkyl group.

10. The transition metal complex of claim 3, wherein each X is methyl.

11. A catalyst system comprising:
at least one activator; and
a transition metal complex having a formula of:

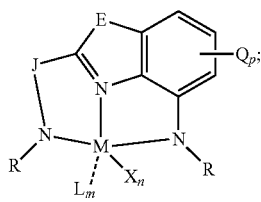

wherein:
M is a transition metal;
E is $NR^2$, $CR^3R^4$, O, S, or $SiR^5R^6$;
Q is optional substitution selected from the group consisting of a hydrocarbyl group, a heteroatom substituent, and any combination thereof;
p is an integer ranging from 0 to 3;
L is an optional neutral ligand, with two L optionally being joined together to form a bidentate neutral ligand;
m is an integer ranging from 0 to 3;
X is an anionic leaving group, with two X optionally being joined together to form a dianionic leaving group;
n is 1 or 2;
wherein a sum of m+n is 4 or less;
J is a linker group contributing two or three atoms that are located within a first chelate ring;
$R^1$ and $R^{1'}$ are independently selected from the group consisting of a hydrocarbyl group and a trihydrocarbylsilyl group;

$R^2$ is a hydrocarbyl group;
$R^3$ and $R^4$ are independently selected from the group consisting of H, a hydrocarbyl group, and a trihydrocarbylsilyl group; and
$R^5$ and $R^6$ are independently a hydrocarbyl group.

12. The catalyst system of claim 11, wherein:
$R^1$ and $R^{1'}$ are independently selected from the group consisting of an alkyl group, an aryl group, and a trihydrocarbylsilyl group;
$R^2$ is an alkyl group or an aryl group;
$R^3$ and $R^4$ are independently selected from the group consisting of H, an alkyl group, an aryl group, and a trihydrocarbylsilyl group; and
$R^5$ and $R^6$ are independently selected from the group consisting of an alkyl group and an aryl group.

13. The catalyst system of claim 11, wherein the at least one activator comprises an alumoxane or a non-coordinating anion.

14. The catalyst system of claim 13, wherein the non-coordinating anion comprises a borate anion.

15. The catalyst system of claim 13, wherein M is a group 4 transition metal.

16. The catalyst system of claim 15, wherein M is Hf.

17. The catalyst system of claim 15, wherein $R^1$ and $R^{1'}$ are each an aryl group.

18. The catalyst system of claim 15, wherein J contributes three atoms that are located within the first chelate ring.

19. The catalyst system of claim 15, wherein J is selected from the group consisting of

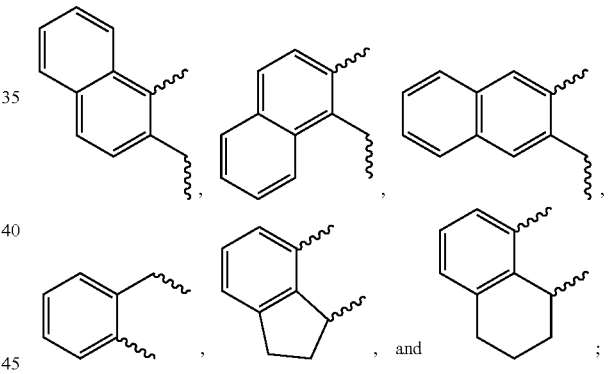

wherein each wavy bond indicates a point of connectivity to the first chelate ring.

20. The catalyst system of claim 15, wherein E is $NR^2$.

21. The catalyst system of claim 20, wherein $R^2$ is an alkyl group.

22. The catalyst system of claim 15, wherein each X is methyl.

23. A method comprising:
providing an olefinic feed; and
contacting the catalyst system of claim 11 with the olefinic feed under polymerization reaction conditions.

24. The method of claim 23, wherein the at least one activator comprises an alumoxane or a non-coordinating anion.

25. The method of claim 24, wherein the non-coordinating anion comprises a borate anion.

26. The method of claim 24, wherein:
$R^1$ and $R^{1'}$ are independently selected from the group consisting of an alkyl group, an aryl group, and a trihydrocarbylsilyl group;
$R^2$ is an alkyl group or an aryl group;

$R^3$ and $R^4$ are independently selected from the group consisting of H, an alkyl group, an aryl group, and a trihydrocarbylsilyl group; and $R^5$ and $R^6$ are independently selected from the group consisting of an alkyl group and an aryl group.

27. The method of claim 24, wherein M is a group 4 transition metal.

28. The method of claim 27, wherein M is Hf.

29. The method of claim 27, wherein each R is an aryl group.

30. The method of claim 27, wherein J contributes three atoms that are located within the first chelate ring.

31. The method of claim 27, wherein J is selected from the group consisting of

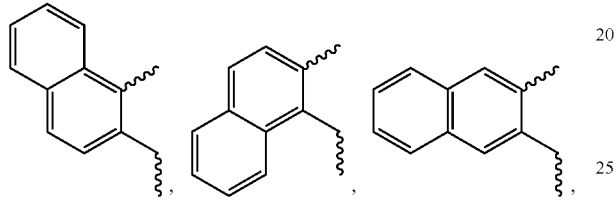

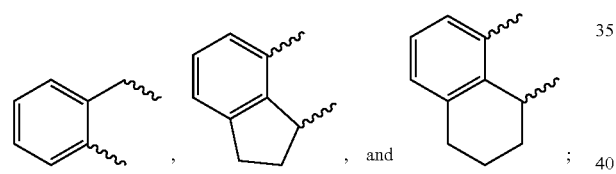

wherein each wavy bond indicates a point of connectivity to the first chelate ring.

32. The method of claim 27, wherein E is $NR^2$.

33. The method of claim 32, wherein $R^2$ is an alkyl group.

34. The method of claim 27, wherein each X is methyl.

35. A transition metal complex having a structure selected from the group consisting of

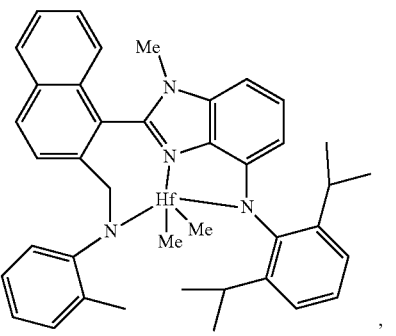

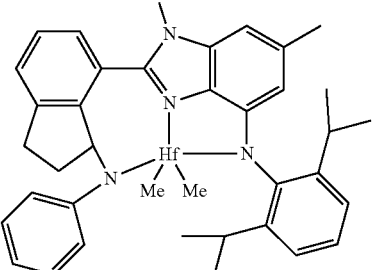

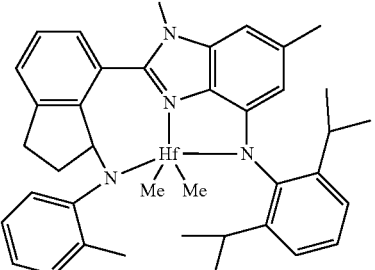

, and

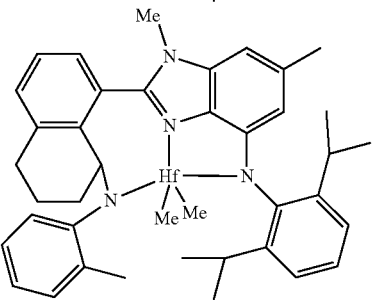

* * * * *